United States Patent
Lunde et al.

(10) Patent No.: US 12,532,899 B2
(45) Date of Patent: Jan. 27, 2026

(54) CONTROLLED ENZYMATIC BROWNING OF A NON-MEAT PROTEIN CONTAINING MATERIAL

(71) Applicant: Novozymes A/S, Bagsvaerd (DK)

(72) Inventors: Christina Lunde, Copenhagen (DK); Jesper Salomon, Holte (DK)

(73) Assignee: Novozymes A/S, Bagsvaerd (DK)

( * ) Notice: Subject to any disclaimer, the term of this patent is extended or adjusted under 35 U.S.C. 154(b) by 451 days.

(21) Appl. No.: 18/017,998

(22) PCT Filed: Aug. 6, 2021

(86) PCT No.: PCT/EP2021/072012
§ 371 (c)(1),
(2) Date: Jan. 25, 2023

(87) PCT Pub. No.: WO2022/029293
PCT Pub. Date: Feb. 10, 2022

(65) Prior Publication Data
US 2023/0276826 A1    Sep. 7, 2023

(30) Foreign Application Priority Data

Aug. 7, 2020   (EP) .................................... 20190047

(51) Int. Cl.
*A23J 3/34*    (2006.01)
*A23J 3/14*    (2006.01)
*A23J 3/22*    (2006.01)
*A23L 5/43*    (2016.01)

(52) U.S. Cl.
CPC . *A23J 3/34* (2013.01); *A23J 3/14* (2013.01); *A23J 3/227* (2013.01); *A23L 5/43* (2016.08)

(58) Field of Classification Search
CPC ...... A23J 3/34; A23J 3/18; A23J 3/227; A23J 3/14; A23J 3/08; A23J 3/26; A23J 3/20; A23J 3/16; A23L 13/428; A23L 13/42; A23L 13/424; A23L 5/43
See application file for complete search history.

(56) References Cited

U.S. PATENT DOCUMENTS

| | | |
|---|---|---|
| 3,958,019 A | 5/1976 | Sato et al. |
| 4,536,406 A | 8/1985 | Brander et al. |
| 6,399,561 B1 | 6/2002 | Schneider et al. |
| 6,607,777 B1 | 8/2003 | Walsh et al. |
| 2017/0303558 A1 | 10/2017 | Eisner et al. |

FOREIGN PATENT DOCUMENTS

| | | |
|---|---|---|
| CN | 101389228 A | 3/2009 |
| EP | 1180332 A1 | 2/2002 |
| GB | 2479218 A | 10/2011 |
| JP | 2004321077 A | 11/2004 |
| JP | 2009165450 A | 7/2009 |
| WO | 2007097433 A1 | 8/2007 |
| WO | 2015038796 A2 | 3/2015 |
| WO | 2016097270 A1 | 6/2016 |
| WO | 2019161239 A1 | 8/2019 |

OTHER PUBLICATIONS

JP 2009165450 A machine translation (Year: 2009).*
Takamiya et al (JP 5208723 B2) machine translation (Year: 2013).*
Zhang et al., 2017, Journal of food processing and preservation, vol. 42, No. 2, p. e13515.

* cited by examiner

*Primary Examiner* — Vera Stulii
(74) *Attorney, Agent, or Firm* — Yoshimi D. Barron

(57) ABSTRACT

The present invention relates to use of a laccase for controlled enzymatic browning of a meat analogue product comprising a red pigment which changes colour when oxidized. Preferably, the laccase is embedded in a fat having a melting temperature of at least 25° C. such that the oxidation of the red pigment occurs only at elevated temperature, e.g. during cooking of the meat analogue product.

17 Claims, No Drawings

Specification includes a Sequence Listing.

SEQUENCE LISTING

<160> NUMBER OF SEQ ID NOS: 10

<210> SEQ ID NO 1
<211> LENGTH: 573
<212> TYPE: PRT
<213> ORGANISM: Myceliophthora thermophila

<400> SEQUENCE: 1

```
Gln Gln Ser Cys Asn Thr Pro Ser Asn Arg Ala Cys Trp Thr Asp Gly
1               5                   10                  15

Tyr Asp Ile Asn Thr Asp Tyr Glu Val Asp Ser Pro Asp Thr Gly Val
            20                  25                  30

Val Arg Pro Tyr Thr Leu Thr Leu Thr Glu Val Asp Asn Trp Thr Gly
        35                  40                  45

Pro Asp Gly Val Val Lys Glu Lys Val Met Leu Val Asn Asn Ser Ile
    50                  55                  60

Ile Gly Pro Thr Ile Phe Ala Asp Trp Gly Asp Thr Ile Gln Val Thr
65                  70                  75                  80

Val Ile Asn Asn Leu Glu Thr Asn Gly Thr Ser Ile His Trp His Gly
            85                  90                  95

Leu His Gln Lys Gly Thr Asn Leu His Asp Gly Ala Asn Gly Ile Thr
            100                 105                 110

Glu Cys Pro Ile Pro Pro Lys Gly Gly Arg Lys Val Tyr Arg Phe Lys
        115                 120                 125

Ala Gln Gln Tyr Gly Thr Ser Trp Tyr His Ser His Phe Ser Ala Gln
    130                 135                 140

Tyr Gly Asn Gly Val Val Gly Ala Ile Gln Ile Asn Gly Pro Ala Ser
145                 150                 155                 160

Leu Pro Tyr Asp Thr Asp Leu Gly Val Phe Pro Ile Ser Asp Tyr Tyr
                165                 170                 175

Tyr Ser Ser Ala Asp Glu Leu Val Glu Leu Thr Lys Asn Ser Gly Ala
            180                 185                 190

Pro Phe Ser Asp Asn Val Leu Phe Asn Gly Thr Ala Lys His Pro Glu
        195                 200                 205

Thr Gly Glu Gly Glu Tyr Ala Asn Val Thr Leu Thr Pro Gly Arg Arg
    210                 215                 220
```

```
His Arg Leu Arg Leu Ile Asn Thr Ser Val Glu Asn His Phe Gln Val
225                 230                 235                 240

Ser Leu Val Asn His Thr Met Thr Ile Ile Ala Ala Asp Met Val Pro
                245                 250                 255

Val Asn Ala Met Thr Val Asp Ser Leu Phe Leu Gly Val Gly Gln Arg
            260                 265                 270

Tyr Asp Val Val Ile Glu Ala Ser Arg Thr Pro Gly Asn Tyr Trp Phe
        275                 280                 285

Asn Val Thr Phe Gly Gly Leu Leu Cys Gly Gly Ser Arg Asn Pro
    290                 295                 300

Tyr Pro Ala Ala Ile Phe His Tyr Ala Gly Ala Pro Gly Gly Pro Pro
305                 310                 315                 320

Thr Asp Glu Gly Lys Ala Pro Val Asp His Asn Cys Leu Asp Leu Pro
                325                 330                 335

Asn Leu Lys Pro Val Val Ala Arg Asp Val Pro Leu Ser Gly Phe Ala
            340                 345                 350

Lys Arg Pro Asp Asn Thr Leu Asp Val Thr Leu Asp Thr Thr Gly Thr
        355                 360                 365

Pro Leu Phe Val Trp Lys Val Asn Gly Ser Ala Ile Asn Ile Asp Trp
    370                 375                 380

Gly Arg Pro Val Val Asp Tyr Val Leu Thr Gln Asn Thr Ser Phe Pro
385                 390                 395                 400

Pro Gly Tyr Asn Ile Val Glu Val Asn Gly Ala Asp Gln Trp Ser Tyr
                405                 410                 415

Trp Leu Ile Glu Asn Asp Pro Gly Ala Pro Phe Thr Leu Pro His Pro
            420                 425                 430

Met His Leu His Gly His Asp Phe Tyr Val Leu Gly Arg Ser Pro Asp
        435                 440                 445

Glu Ser Pro Ala Ser Asn Glu Arg His Val Phe Asp Pro Ala Arg Asp
    450                 455                 460

Ala Gly Leu Leu Ser Gly Ala Asn Pro Val Arg Arg Asp Val Thr Met
465                 470                 475                 480

Leu Pro Ala Phe Gly Trp Val Val Leu Ala Phe Arg Ala Asp Asn Pro
                485                 490                 495

Gly Ala Trp Leu Phe His Cys His Ile Ala Trp His Val Ser Gly Gly
            500                 505                 510

Leu Gly Val Val Tyr Leu Glu Arg Ala Asp Asp Leu Arg Gly Ala Val
        515                 520                 525

Ser Asp Ala Asp Ala Asp Leu Asp Arg Leu Cys Ala Asp Trp Arg
    530                 535                 540

Arg Tyr Trp Pro Thr Asn Pro Tyr Pro Lys Ser Asp Ser Gly Leu Lys
545                 550                 555                 560

His Arg Trp Val Glu Glu Gly Glu Trp Leu Val Lys Ala
                565                 570

<210> SEQ ID NO 2
<211> LENGTH: 512
<212> TYPE: PRT
<213> ORGANISM: Rhizoctonia solani

<400> SEQUENCE: 2

Ala Ala Val Arg Asn Tyr Lys Phe Asp Ile Lys Asn Val Asn Val Ala
1               5                   10                  15

Pro Asp Gly Phe Gln Arg Pro Ile Val Ser Val Asn Gly Leu Val Pro
```

```
                  20                  25                  30
Gly Thr Leu Ile Thr Ala Asn Lys Gly Asp Thr Leu Arg Ile Asn Val
             35                  40                  45
Thr Asn Gln Leu Thr Asp Pro Ser Met Arg Arg Ala Thr Thr Ile His
         50                  55                  60
Trp His Gly Leu Phe Gln Ala Thr Thr Ala Asp Glu Asp Gly Pro Ala
 65                  70                  75                  80
Phe Val Thr Gln Cys Pro Ile Ala Gln Asn Leu Ser Tyr Thr Tyr Glu
                 85                  90                  95
Ile Pro Leu His Gly Gln Thr Gly Thr Met Trp Tyr His Ala His Leu
                100                 105                 110
Ala Ser Gln Tyr Val Asp Gly Leu Arg Gly Pro Leu Val Ile Tyr Asp
            115                 120                 125
Pro Asn Asp Pro His Lys Ser Arg Tyr Asp Val Asp Asp Ala Ser Thr
        130                 135                 140
Val Val Met Leu Glu Asp Trp Tyr His Thr Pro Ala Pro Val Leu Glu
145                 150                 155                 160
Lys Gln Met Phe Ser Thr Asn Thr Ala Leu Leu Ser Pro Val Pro
                165                 170                 175
Asp Ser Gly Leu Ile Asn Gly Lys Gly Arg Tyr Val Gly Pro Ala
            180                 185                 190
Val Pro Arg Ser Val Ile Asn Val Lys Arg Gly Lys Arg Tyr Arg Leu
            195                 200                 205
Arg Val Ile Asn Ala Ser Ala Ile Gly Ser Phe Thr Phe Ser Ile Glu
        210                 215                 220
Gly His Arg Leu Thr Val Ile Glu Ala Asp Gly Ile Pro His Gln Pro
225                 230                 235                 240
Leu Pro Val Asp Ser Phe Gln Ile Tyr Ala Gly Gln Arg Tyr Ser Val
                245                 250                 255
Ile Val Glu Ala Asn Gln Thr Ala Ala Asn Tyr Trp Ile Arg Ala Pro
                260                 265                 270
Met Thr Val Ala Gly Ala Gly Thr Asn Ala Asn Leu Asp Pro Thr Asn
            275                 280                 285
Val Phe Ala Val Leu His Tyr Glu Gly Ala Pro Asn Ala Glu Pro Thr
        290                 295                 300
Thr Glu Gln Gly Ser Ala Ile Gly Thr Ala Leu Val Glu Glu Asn Leu
305                 310                 315                 320
His Ala Leu Ile Asn Pro Gly Ala Pro Gly Gly Ser Ala Pro Ala Asp
                325                 330                 335
Val Ser Leu Asn Leu Ala Ile Gly Arg Ser Thr Val Asp Gly Ile Leu
            340                 345                 350
Arg Phe Thr Phe Asn Asn Ile Lys Tyr Glu Ala Pro Ser Leu Pro Thr
        355                 360                 365
Leu Leu Lys Ile Leu Ala Asn Asn Ala Ser Asn Asp Ala Asp Phe Thr
    370                 375                 380
Pro Asn Glu His Thr Ile Val Leu Pro His Asn Lys Val Ile Gly Ala
385                 390                 395                 400
Gln His His Arg Gly Ala Asp Pro Ile His Leu His Gly His Val
                405                 410                 415
Phe Asp Ile Val Lys Ser Leu Gly Gly Thr Pro Asn Tyr Val Asn Pro
            420                 425                 430
Pro Arg Arg Asp Val Val Arg Val Gly Gly Thr Gly Val Val Leu Arg
        435                 440                 445
```

```
Phe Lys Ala Asp Asn Pro Gly Pro Trp Phe Val His Cys His Ile Asp
    450                 455                 460

Cys Thr Trp Arg Leu Gly Ser His Leu Ser Leu Pro Arg Pro Pro Ala
465                 470                 475                 480

Arg Phe Ala Arg Val Ser Ser Arg Ser Ser Pro Thr Met Pro Gly Thr
                485                 490                 495

Ser Ser Ala Pro Ser Thr Arg Leu Phe Leu Pro Ile Cys Ser Lys Trp
            500                 505                 510
```

<210> SEQ ID NO 3
<211> LENGTH: 521
<212> TYPE: PRT
<213> ORGANISM: Coprinus cinereus

<400> SEQUENCE: 3

```
Gln Ile Val Asn Ser Val Asp Thr Met Thr Leu Thr Asn Ala Asn Val
1               5                   10                  15

Ser Pro Asp Gly Phe Thr Arg Ala Gly Ile Leu Val Asn Gly Val His
                20                  25                  30

Gly Pro Leu Ile Arg Gly Gly Lys Asn Asp Asn Phe Glu Leu Asn Val
            35                  40                  45

Val Asn Asp Leu Asp Asn Pro Thr Met Leu Arg Pro Thr Ser Ile His
50                  55                  60

Trp His Gly Leu Phe Gln Arg Gly Thr Asn Trp Ala Asp Gly Ala Asp
65                  70                  75                  80

Gly Val Asn Gln Cys Pro Ile Ser Pro Gly His Ala Phe Leu Tyr Lys
                85                  90                  95

Phe Thr Pro Ala Gly His Ala Gly Thr Phe Trp Tyr His Ser His Phe
                100                 105                 110

Gly Thr Gln Tyr Cys Asp Gly Leu Arg Gly Pro Met Val Ile Tyr Asp
            115                 120                 125

Asp Asn Asp Pro His Ala Ala Leu Tyr Asp Glu Asp Glu Asn Thr
            130                 135                 140

Ile Ile Thr Leu Ala Asp Trp Tyr His Ile Pro Ala Pro Ser Ile Gln
145                 150                 155                 160

Gly Ala Ala Gln Pro Asp Ala Thr Leu Ile Asn Gly Lys Gly Arg Tyr
                165                 170                 175

Val Gly Gly Pro Ala Ala Glu Leu Ser Ile Val Asn Val Glu Gln Gly
            180                 185                 190

Lys Lys Tyr Arg Met Arg Leu Ile Ser Leu Ser Cys Asp Pro Asn Trp
        195                 200                 205

Gln Phe Ser Ile Asp Gly His Glu Leu Thr Ile Ile Glu Val Asp Gly
    210                 215                 220

Gln Leu Thr Glu Pro His Thr Val Asp Arg Leu Gln Ile Phe Thr Gly
225                 230                 235                 240

Gln Arg Tyr Ser Phe Val Leu Asp Ala Asn Gln Pro Val Asp Asn Tyr
                245                 250                 255

Trp Ile Arg Ala Gln Pro Asn Lys Gly Arg Asn Gly Leu Ala Gly Thr
            260                 265                 270

Phe Ala Asn Gly Val Asn Ser Ala Ile Leu Arg Tyr Ala Gly Ala Ala
        275                 280                 285

Asn Ala Asp Pro Thr Thr Ser Ala Asn Pro Asn Pro Ala Gln Leu Asn
    290                 295                 300

Glu Ala Asp Leu His Ala Leu Ile Asp Pro Ala Ala Pro Gly Ile Pro
```

-continued

```
              305                 310                 315                 320
        Thr Pro Gly Ala Ala Asp Val Asn Leu Arg Phe Gln Leu Gly Phe Ser
                        325                 330                 335

Gly Gly Arg Phe Thr Ile Asn Gly Thr Ala Tyr Glu Ser Pro Ser Val
                        340                 345                 350

Pro Thr Leu Leu Gln Ile Met Ser Gly Ala Gln Ser Ala Asn Asp Leu
                        355                 360                 365

Leu Pro Ala Gly Ser Val Tyr Glu Leu Pro Arg Asn Gln Val Val Glu
                        370                 375                 380

Leu Val Val Pro Ala Gly Val Leu Gly Gly Pro His Pro Phe His Leu
        385                 390                 395                 400

His Gly His Ala Phe Ser Val Val Arg Ser Ala Gly Ser Ser Thr Tyr
                        405                 410                 415

Asn Phe Val Asn Pro Val Lys Arg Asp Val Val Ser Leu Gly Val Thr
                        420                 425                 430

Gly Asp Glu Val Thr Ile Arg Phe Val Thr Asp Asn Pro Gly Pro Trp
                        435                 440                 445

Phe Phe His Cys His Ile Glu Phe His Leu Met Asn Gly Leu Ala Ile
                        450                 455                 460

Val Phe Ala Glu Asp Met Ala Asn Thr Val Asp Ala Asn Asn Pro Pro
        465                 470                 475                 480

Val Glu Trp Ala Gln Leu Cys Glu Ile Tyr Asp Asp Leu Pro Pro Glu
                        485                 490                 495

Ala Thr Ser Ile Gln Thr Val Val Arg Arg Ala Glu Pro Thr Gly Phe
                        500                 505                 510

Ser Ala Lys Phe Arg Arg Glu Gly Leu
                        515                 520

<210> SEQ ID NO 4
<211> LENGTH: 499
<212> TYPE: PRT
<213> ORGANISM: Polyporus pinsitus

<400> SEQUENCE: 4

Gly Ile Gly Pro Val Ala Asp Leu Thr Ile Thr Asn Ala Ala Val Ser
        1               5                   10                  15

Pro Asp Gly Phe Ser Arg Gln Ala Val Val Asn Gly Gly Thr Pro
                        20                  25                  30

Gly Pro Leu Ile Thr Gly Asn Met Gly Asp Arg Phe Gln Leu Asn Val
                        35                  40                  45

Ile Asp Asn Leu Thr Asn His Thr Met Leu Lys Ser Thr Ser Ile His
        50                  55                  60

Trp His Gly Phe Phe Gln Lys Gly Thr Asn Trp Ala Asp Gly Pro Ala
        65                  70                  75                  80

Phe Ile Asn Gln Cys Pro Ile Ser Ser Gly His Ser Phe Leu Tyr Asp
                        85                  90                  95

Phe Gln Val Pro Asp Gln Ala Gly Thr Phe Trp Tyr His Ser His Leu
                        100                 105                 110

Ser Thr Gln Tyr Cys Asp Gly Leu Arg Gly Pro Phe Val Val Tyr Asp
                        115                 120                 125

Pro Asn Asp Pro Ala Ala Asp Leu Tyr Asp Val Asp Asn Asp Asp Thr
                        130                 135                 140

Val Ile Thr Leu Val Asp Trp Tyr His Val Ala Ala Lys Leu Gly Pro
        145                 150                 155                 160
```

```
Ala Phe Pro Leu Gly Ala Asp Ala Thr Leu Ile Asn Gly Lys Gly Arg
                165                 170                 175

Ser Pro Ser Thr Thr Thr Ala Asp Leu Ser Val Ile Ser Val Thr Pro
            180                 185                 190

Gly Lys Arg Tyr Arg Phe Arg Leu Val Ser Leu Ser Cys Asp Pro Asn
            195                 200                 205

Tyr Thr Phe Ser Ile Asp Gly His Asn Met Thr Ile Ile Glu Thr Asp
            210                 215                 220

Ser Ile Asn Thr Ala Pro Leu Val Val Asp Ser Ile Gln Ile Phe Ala
225                 230                 235                 240

Ala Gln Arg Tyr Ser Phe Val Leu Glu Ala Asn Gln Ala Val Asp Asn
            245                 250                 255

Tyr Trp Ile Arg Ala Asn Pro Asn Phe Gly Asn Val Gly Phe Thr Gly
            260                 265                 270

Gly Ile Asn Ser Ala Ile Leu Arg Tyr Asp Gly Ala Ala Ala Val Glu
            275                 280                 285

Pro Thr Thr Thr Gln Thr Thr Ser Thr Ala Pro Leu Asn Glu Val Asn
            290                 295                 300

Leu His Pro Leu Val Thr Thr Ala Val Pro Gly Ser Pro Val Ala Gly
305                 310                 315                 320

Gly Val Asp Leu Ala Ile Asn Met Ala Phe Asn Phe Asn Gly Thr Asn
            325                 330                 335

Phe Phe Ile Asn Gly Ala Ser Phe Thr Pro Pro Thr Val Pro Val Leu
            340                 345                 350

Leu Gln Ile Ile Ser Gly Ala Gln Asn Ala Gln Asp Leu Leu Pro Ser
            355                 360                 365

Gly Ser Val Tyr Ser Leu Pro Ser Asn Ala Asp Ile Glu Ile Ser Phe
            370                 375                 380

Pro Ala Thr Ala Ala Pro Gly Ala Pro His Pro Phe His Leu His
385                 390                 395                 400

Gly His Ala Phe Ala Val Val Arg Ser Ala Gly Ser Thr Val Tyr Asn
            405                 410                 415

Tyr Asp Asn Pro Ile Phe Arg Asp Val Val Ser Thr Gly Thr Pro Ala
            420                 425                 430

Ala Gly Asp Asn Val Thr Ile Arg Phe Arg Thr Asp Asn Pro Gly Pro
            435                 440                 445

Trp Phe Leu His Cys His Ile Asp Phe His Leu Glu Ala Gly Phe Ala
            450                 455                 460

Val Val Phe Ala Glu Asp Ile Pro Asp Val Ala Ser Ala Asn Pro Val
465                 470                 475                 480

Pro Gln Ala Trp Ser Asp Leu Cys Pro Thr Tyr Asp Ala Leu Asp Pro
            485                 490                 495

Ser Asp Gln

<210> SEQ ID NO 5
<211> LENGTH: 620
<212> TYPE: PRT
<213> ORGANISM: Myceliophthora thermophila

<400> SEQUENCE: 5

Met Arg Ser Phe Ile Ser Ala Ala Thr Leu Leu Val Gly Ile Leu Thr
1               5                   10                  15

Pro Ser Val Ala Ala Ala Pro Pro Ser Thr Pro Glu Gln Arg Asp Leu
            20                  25                  30
```

-continued

```
Leu Val Pro Ile Thr Glu Arg Glu Ala Ala Val Lys Ala Arg Gln
         35                  40                  45

Gln Ser Cys Asn Thr Pro Ser Asn Arg Ala Cys Trp Thr Asp Gly Tyr
 50                  55                  60

Asp Ile Asn Thr Asp Tyr Glu Val Asp Ser Pro Asp Thr Gly Val Val
 65                  70                  75                  80

Arg Pro Tyr Thr Leu Thr Leu Thr Glu Val Asp Asn Trp Thr Gly Pro
                 85                  90                  95

Asp Gly Val Val Lys Glu Lys Val Met Leu Val Asn Asn Ser Ile Ile
            100                 105                 110

Gly Pro Thr Ile Phe Ala Asp Trp Gly Asp Thr Ile Gln Val Thr Val
            115                 120                 125

Ile Asn Asn Leu Glu Thr Asn Gly Thr Ser Ile His Trp His Gly Leu
        130                 135                 140

His Gln Lys Gly Thr Asn Leu His Asp Gly Ala Asn Gly Ile Thr Glu
145                 150                 155                 160

Cys Pro Ile Pro Pro Lys Gly Gly Arg Lys Val Tyr Arg Phe Lys Ala
                165                 170                 175

Gln Gln Tyr Gly Thr Ser Trp Tyr His Ser His Phe Ser Ala Gln Tyr
            180                 185                 190

Gly Asn Gly Val Val Gly Ala Ile Gln Ile Asn Gly Pro Ala Ser Leu
        195                 200                 205

Pro Tyr Asp Thr Asp Leu Gly Val Phe Pro Ile Ser Asp Tyr Tyr Tyr
    210                 215                 220

Ser Ser Ala Asp Glu Leu Val Glu Leu Thr Lys Asn Ser Gly Ala Pro
225                 230                 235                 240

Phe Ser Asp Asn Val Leu Phe Asn Gly Thr Ala Lys His Pro Glu Thr
                245                 250                 255

Gly Glu Gly Glu Tyr Ala Asn Val Thr Leu Thr Pro Gly Arg Arg His
            260                 265                 270

Arg Leu Arg Leu Ile Asn Thr Ser Val Glu Asn His Phe Gln Val Ser
        275                 280                 285

Leu Val Asn His Thr Met Thr Ile Ile Ala Ala Asp Met Val Pro Val
    290                 295                 300

Asn Ala Met Thr Val Asp Ser Leu Phe Leu Gly Val Gly Gln Arg Tyr
305                 310                 315                 320

Asp Val Val Ile Glu Ala Ser Arg Thr Pro Gly Asn Tyr Trp Phe Asn
                325                 330                 335

Val Thr Phe Gly Gly Leu Leu Cys Gly Gly Ser Arg Asn Pro Tyr
            340                 345                 350

Pro Ala Ala Ile Phe His Tyr Ala Gly Ala Pro Gly Gly Pro Pro Thr
        355                 360                 365

Asp Glu Gly Lys Ala Pro Val Asp His Asn Cys Leu Asp Leu Pro Asn
    370                 375                 380

Leu Lys Pro Val Val Ala Arg Asp Val Pro Leu Ser Gly Phe Ala Lys
385                 390                 395                 400

Arg Pro Asp Asn Thr Leu Asp Val Thr Leu Asp Thr Thr Gly Thr Pro
                405                 410                 415

Leu Phe Val Trp Lys Val Asn Gly Ser Ala Ile Asn Ile Asp Trp Gly
            420                 425                 430

Arg Pro Val Val Asp Tyr Val Leu Thr Gln Asn Thr Ser Phe Pro Pro
        435                 440                 445

Gly Tyr Asn Ile Val Glu Val Asn Gly Ala Asp Gln Trp Ser Tyr Trp
```

```
            450                 455                 460
Leu Ile Glu Asn Asp Pro Gly Ala Pro Phe Thr Leu Pro His Pro Met
465                 470                 475                 480

His Leu His Gly His Asp Phe Tyr Val Leu Gly Arg Ser Pro Asp Glu
                485                 490                 495

Ser Pro Ala Ser Asn Glu Arg His Val Phe Asp Pro Ala Arg Asp Ala
            500                 505                 510

Gly Leu Leu Ser Gly Ala Asn Pro Val Arg Arg Asp Val Thr Met Leu
            515                 520                 525

Pro Ala Phe Gly Trp Val Val Leu Ala Phe Arg Ala Asp Asn Pro Gly
            530                 535                 540

Ala Trp Leu Phe His Cys His Ile Ala Trp His Val Ser Gly Gly Leu
545                 550                 555                 560

Gly Val Val Tyr Leu Glu Arg Ala Asp Asp Leu Arg Gly Ala Val Ser
                565                 570                 575

Asp Ala Asp Ala Asp Asp Leu Asp Arg Leu Cys Ala Asp Trp Arg Arg
            580                 585                 590

Tyr Trp Pro Thr Asn Pro Tyr Pro Lys Ser Asp Ser Gly Leu Lys His
            595                 600                 605

Arg Trp Val Glu Glu Gly Glu Trp Leu Val Lys Ala
            610                 615                 620

<210> SEQ ID NO 6
<211> LENGTH: 531
<212> TYPE: PRT
<213> ORGANISM: Rhizoctonia solani

<400> SEQUENCE: 6

Met Leu Ser Ser Ile Thr Leu Leu Pro Leu Leu Ala Ala Val Ser Thr
1               5                   10                  15

Pro Ala Phe Ala Ala Val Arg Asn Tyr Lys Phe Asp Ile Lys Asn Val
                20                  25                  30

Asn Val Ala Pro Asp Gly Phe Gln Arg Pro Ile Val Ser Val Asn Gly
            35                  40                  45

Leu Val Pro Gly Thr Leu Ile Thr Ala Asn Lys Gly Asp Thr Leu Arg
        50                  55                  60

Ile Asn Val Thr Asn Gln Leu Thr Asp Pro Ser Met Arg Arg Ala Thr
65                  70                  75                  80

Thr Ile His Trp His Gly Leu Phe Gln Ala Thr Thr Ala Asp Glu Asp
                85                  90                  95

Gly Pro Ala Phe Val Thr Gln Cys Pro Ile Ala Gln Asn Leu Ser Tyr
            100                 105                 110

Thr Tyr Glu Ile Pro Leu His Gly Gln Thr Gly Thr Met Trp Tyr His
            115                 120                 125

Ala His Leu Ala Ser Gln Tyr Val Asp Gly Leu Arg Gly Pro Leu Val
130                 135                 140

Ile Tyr Asp Pro Asn Asp Pro His Lys Ser Arg Tyr Asp Val Asp Asp
145                 150                 155                 160

Ala Ser Thr Val Val Met Leu Glu Asp Trp Tyr His Thr Pro Ala Pro
                165                 170                 175

Val Leu Glu Lys Gln Met Phe Ser Thr Asn Asn Thr Ala Leu Leu Ser
            180                 185                 190

Pro Val Pro Asp Ser Gly Leu Ile Asn Gly Lys Gly Arg Tyr Val Gly
            195                 200                 205
```

```
Gly Pro Ala Val Pro Arg Ser Val Ile Asn Val Lys Arg Gly Lys Arg
    210                 215                 220

Tyr Arg Leu Arg Val Ile Asn Ala Ser Ala Ile Gly Ser Phe Thr Phe
225                 230                 235                 240

Ser Ile Glu Gly His Arg Leu Thr Val Ile Glu Ala Asp Gly Ile Pro
                245                 250                 255

His Gln Pro Leu Pro Val Asp Ser Phe Gln Ile Tyr Ala Gly Gln Arg
            260                 265                 270

Tyr Ser Val Ile Val Glu Ala Asn Gln Thr Ala Ala Asn Tyr Trp Ile
        275                 280                 285

Arg Ala Pro Met Thr Val Ala Gly Ala Gly Thr Asn Ala Asn Leu Asp
    290                 295                 300

Pro Thr Asn Val Phe Ala Val Leu His Tyr Glu Gly Ala Pro Asn Ala
305                 310                 315                 320

Glu Pro Thr Thr Glu Gln Gly Ser Ala Ile Gly Thr Ala Leu Val Glu
                325                 330                 335

Glu Asn Leu His Ala Leu Ile Asn Pro Gly Ala Pro Gly Gly Ser Ala
            340                 345                 350

Pro Ala Asp Val Ser Leu Asn Leu Ala Ile Gly Arg Ser Thr Val Asp
        355                 360                 365

Gly Ile Leu Arg Phe Thr Phe Asn Asn Ile Lys Tyr Glu Ala Pro Ser
    370                 375                 380

Leu Pro Thr Leu Leu Lys Ile Leu Ala Asn Asn Ala Ser Asn Asp Ala
385                 390                 395                 400

Asp Phe Thr Pro Asn Glu His Thr Ile Val Leu Pro His Asn Lys Val
                405                 410                 415

Ile Gly Ala Gln His His Arg Gly Ala Asp His Pro Ile His Leu His
            420                 425                 430

Gly His Val Phe Asp Ile Val Lys Ser Leu Gly Gly Thr Pro Asn Tyr
        435                 440                 445

Val Asn Pro Pro Arg Arg Asp Val Val Arg Val Gly Thr Gly Val
    450                 455                 460

Val Leu Arg Phe Lys Ala Asp Asn Pro Gly Pro Trp Phe Val His Cys
465                 470                 475                 480

His Ile Asp Cys Thr Trp Arg Leu Gly Ser His Leu Ser Leu Pro Arg
                485                 490                 495

Pro Pro Ala Arg Phe Ala Arg Val Ser Ser Arg Ser Ser Pro Thr Met
            500                 505                 510

Pro Gly Thr Ser Ser Ala Pro Ser Thr Arg Leu Phe Leu Pro Ile Cys
        515                 520                 525

Ser Lys Trp
    530

<210> SEQ ID NO 7
<211> LENGTH: 539
<212> TYPE: PRT
<213> ORGANISM: Coprinus cinereus

<400> SEQUENCE: 7

Met Val Lys Asn Leu Leu Ser Phe Ala Leu Leu Ala Ile Ser Val Ala
1               5                   10                  15

Asn Ala Gln Ile Val Asn Ser Val Asp Thr Met Thr Leu Thr Asn Ala
            20                  25                  30

Asn Val Ser Pro Asp Gly Phe Thr Arg Ala Gly Ile Leu Val Asn Gly
        35                  40                  45
```

-continued

```
Val His Gly Pro Leu Ile Arg Gly Gly Lys Asn Asp Asn Phe Glu Leu
     50                  55                  60
Asn Val Val Asn Asp Leu Asp Asn Pro Thr Met Leu Arg Pro Thr Ser
 65                  70                  75                  80
Ile His Trp His Gly Leu Phe Gln Arg Gly Thr Asn Trp Ala Asp Gly
                     85                  90                  95
Ala Asp Gly Val Asn Gln Cys Pro Ile Ser Pro Gly His Ala Phe Leu
                100                 105                 110
Tyr Lys Phe Thr Pro Ala Gly His Ala Gly Thr Phe Trp Tyr His Ser
            115                 120                 125
His Phe Gly Thr Gln Tyr Cys Asp Gly Leu Arg Gly Pro Met Val Ile
    130                 135                 140
Tyr Asp Asp Asn Asp Pro His Ala Ala Leu Tyr Asp Glu Asp Asp Glu
145                 150                 155                 160
Asn Thr Ile Ile Thr Leu Ala Asp Trp Tyr His Ile Pro Ala Pro Ser
                165                 170                 175
Ile Gln Gly Ala Ala Gln Pro Asp Ala Thr Leu Ile Asn Gly Lys Gly
                180                 185                 190
Arg Tyr Val Gly Pro Ala Ala Glu Leu Ser Ile Val Asn Val Glu
            195                 200                 205
Gln Gly Lys Lys Tyr Arg Met Arg Leu Ile Ser Leu Ser Cys Asp Pro
    210                 215                 220
Asn Trp Gln Phe Ser Ile Asp Gly His Glu Leu Thr Ile Ile Glu Val
225                 230                 235                 240
Asp Gly Gln Leu Thr Glu Pro His Thr Val Asp Arg Leu Gln Ile Phe
                245                 250                 255
Thr Gly Gln Arg Tyr Ser Phe Val Leu Asp Ala Asn Gln Pro Val Asp
            260                 265                 270
Asn Tyr Trp Ile Arg Ala Gln Pro Asn Lys Gly Arg Asn Gly Leu Ala
        275                 280                 285
Gly Thr Phe Ala Asn Gly Val Asn Ser Ala Ile Leu Arg Tyr Ala Gly
    290                 295                 300
Ala Ala Asn Ala Asp Pro Thr Thr Ser Ala Asn Pro Asn Pro Ala Gln
305                 310                 315                 320
Leu Asn Glu Ala Asp Leu His Ala Leu Ile Asp Pro Ala Ala Pro Gly
                325                 330                 335
Ile Pro Thr Pro Gly Ala Ala Asp Val Asn Leu Arg Phe Gln Leu Gly
        340                 345                 350
Phe Ser Gly Gly Arg Phe Thr Ile Asn Gly Thr Ala Tyr Glu Ser Pro
    355                 360                 365
Ser Val Pro Thr Leu Leu Gln Ile Met Ser Gly Ala Gln Ser Ala Asn
    370                 375                 380
Asp Leu Leu Pro Ala Gly Ser Val Tyr Glu Leu Pro Arg Asn Gln Val
385                 390                 395                 400
Val Glu Leu Val Val Pro Ala Gly Val Leu Gly Pro His Pro Phe
                405                 410                 415
His Leu His Gly His Ala Phe Ser Val Val Arg Ser Ala Gly Ser Ser
                420                 425                 430
Thr Tyr Asn Phe Val Asn Pro Val Lys Arg Asp Val Val Ser Leu Gly
            435                 440                 445
Val Thr Gly Asp Glu Val Thr Ile Arg Phe Val Thr Asp Asn Pro Gly
    450                 455                 460
```

```
Pro Trp Phe Phe His Cys His Ile Glu Phe His Leu Met Asn Gly Leu
465                 470                 475                 480

Ala Ile Val Phe Ala Glu Asp Met Ala Asn Thr Val Asp Ala Asn Asn
            485                 490                 495

Pro Pro Val Glu Trp Ala Gln Leu Cys Glu Ile Tyr Asp Asp Leu Pro
            500                 505                 510

Pro Glu Ala Thr Ser Ile Gln Thr Val Val Arg Arg Ala Glu Pro Thr
            515                 520                 525

Gly Phe Ser Ala Lys Phe Arg Arg Glu Gly Leu
            530                 535

<210> SEQ ID NO 8
<211> LENGTH: 520
<212> TYPE: PRT
<213> ORGANISM: Polyporus pinsitus

<400> SEQUENCE: 8

Met Ser Arg Phe His Ser Leu Leu Ala Phe Val Ala Ser Leu Thr
1               5                   10                  15

Ala Val Ala His Ala Gly Ile Gly Pro Val Ala Asp Leu Thr Ile Thr
            20                  25                  30

Asn Ala Ala Val Ser Pro Asp Gly Phe Ser Arg Gln Ala Val Val
            35                  40                  45

Asn Gly Gly Thr Pro Gly Pro Leu Ile Thr Gly Asn Met Gly Asp Arg
50                  55                  60

Phe Gln Leu Asn Val Ile Asp Asn Leu Thr Asn His Thr Met Leu Lys
65                  70                  75                  80

Ser Thr Ser Ile His Trp His Gly Phe Phe Gln Lys Gly Thr Asn Trp
            85                  90                  95

Ala Asp Gly Pro Ala Phe Ile Asn Gln Cys Pro Ile Ser Ser Gly His
            100                 105                 110

Ser Phe Leu Tyr Asp Phe Gln Val Pro Asp Gln Ala Gly Thr Phe Trp
            115                 120                 125

Tyr His Ser His Leu Ser Thr Gln Tyr Cys Asp Gly Leu Arg Gly Pro
            130                 135                 140

Phe Val Val Tyr Asp Pro Asn Asp Pro Ala Ala Asp Leu Tyr Asp Val
145                 150                 155                 160

Asp Asn Asp Asp Thr Val Ile Thr Leu Val Asp Trp Tyr His Val Ala
                165                 170                 175

Ala Lys Leu Gly Pro Ala Phe Pro Leu Gly Ala Asp Ala Thr Leu Ile
            180                 185                 190

Asn Gly Lys Gly Arg Ser Pro Ser Thr Thr Thr Ala Asp Leu Ser Val
            195                 200                 205

Ile Ser Val Thr Pro Gly Lys Arg Tyr Arg Phe Arg Leu Val Ser Leu
            210                 215                 220

Ser Cys Asp Pro Asn Tyr Thr Phe Ser Ile Asp Gly His Asn Met Thr
225                 230                 235                 240

Ile Ile Glu Thr Asp Ser Ile Asn Thr Ala Pro Leu Val Val Asp Ser
            245                 250                 255

Ile Gln Ile Phe Ala Ala Gln Arg Tyr Ser Phe Val Leu Glu Ala Asn
            260                 265                 270

Gln Ala Val Asp Asn Tyr Trp Ile Arg Ala Asn Pro Asn Phe Gly Asn
            275                 280                 285

Val Gly Phe Thr Gly Gly Ile Asn Ser Ala Ile Leu Arg Tyr Asp Gly
            290                 295                 300
```

```
Ala Ala Ala Val Glu Pro Thr Thr Thr Gln Thr Thr Ser Thr Ala Pro
305                 310                 315                 320

Leu Asn Glu Val Asn Leu His Pro Leu Val Thr Thr Ala Val Pro Gly
            325                 330                 335

Ser Pro Val Ala Gly Gly Val Asp Leu Ala Ile Asn Met Ala Phe Asn
        340                 345                 350

Phe Asn Gly Thr Asn Phe Phe Ile Asn Gly Ala Ser Phe Thr Pro Pro
    355                 360                 365

Thr Val Pro Val Leu Leu Gln Ile Ile Ser Gly Ala Gln Asn Ala Gln
370                 375                 380

Asp Leu Leu Pro Ser Gly Ser Val Tyr Ser Leu Pro Ser Asn Ala Asp
385                 390                 395                 400

Ile Glu Ile Ser Phe Pro Ala Thr Ala Ala Pro Gly Ala Pro His
            405                 410                 415

Pro Phe His Leu His Gly His Ala Phe Ala Val Val Arg Ser Ala Gly
            420                 425                 430

Ser Thr Val Tyr Asn Tyr Asp Asn Pro Ile Phe Arg Asp Val Val Ser
            435                 440                 445

Thr Gly Thr Pro Ala Ala Gly Asp Asn Val Thr Ile Arg Phe Arg Thr
450                 455                 460

Asp Asn Pro Gly Pro Trp Phe Leu His Cys His Ile Asp Phe His Leu
465                 470                 475                 480

Glu Ala Gly Phe Ala Val Val Phe Ala Glu Asp Ile Pro Asp Val Ala
                485                 490                 495

Ser Ala Asn Pro Val Pro Gln Ala Trp Ser Asp Leu Cys Pro Thr Tyr
            500                 505                 510

Asp Ala Leu Asp Pro Ser Asp Gln
        515                 520

<210> SEQ ID NO 9
<211> LENGTH: 596
<212> TYPE: PRT
<213> ORGANISM: Aspergillus niger

<400> SEQUENCE: 9

Met Ser Ile Ser Gln Ser Arg Leu Ala Leu Leu Ala Leu Cys Phe Val
1               5                   10                  15

Gln Trp Val Ser Gly Arg Val Val Gln Phe Gln Leu Asp Leu Thr Tyr
            20                  25                  30

Glu Asp Val Ser Val Ala Gly Asp Val His Lys Ala Ile Val Ser Asn
        35                  40                  45

Gly Gln Val Pro Gly Pro Thr Leu Trp Leu Lys Gln Gly Asp Asp Val
    50                  55                  60

Glu Phe Leu Val Asn Asn Ser Met Ser Ile Ser Thr Thr Val His Phe
65                  70                  75                  80

His Gly Ile Glu Gln Leu Gly Thr Pro Trp Ser Asp Gly Val Pro Gly
                85                  90                  95

Leu Ser Gln Leu Gln Ile Gln Pro Gly Glu Gln Phe Leu Tyr Lys Trp
            100                 105                 110

Lys Ala Ser Gln Tyr Gly Ser Tyr Ile Tyr His Ser His Thr Arg Ala
        115                 120                 125

Gln Ile Asp Asp Gly Leu Tyr Gly Ala Ile Tyr Ile Glu Pro Ala Asp
    130                 135                 140

Ser Val Glu Arg Pro Phe His Leu Ile Ser Gly Ser Asp Ala Asp Glu
```

```
            145                 150                 155                 160
        Gln Gln Ala Met Leu Ala Ala Glu Lys Asn Thr Arg Pro Val Ile Ile
                        165                 170                 175

Ser Asp Trp Arg Ala Phe Ser Ser His Asp Ile Leu Gln Ile Gln Asn
                        180                 185                 190

Glu Ser Gly Val Glu Ala Tyr Cys Ala Asn Ser Val Leu Ile Asn Gly
                        195                 200                 205

Lys Gly Ser Val Ile Cys Pro Ser Gln Glu His Ile Asn Ala Val Thr
            210                 215                 220

Thr Glu Gln Gln Lys Gln Ile Leu Gly Asn Val Thr Leu Thr Asp Met
        225                 230                 235                 240

Gly Cys Leu Pro Pro Thr Pro Gly Val Val Gly Pro Tyr Pro Tyr Asp
                        245                 250                 255

Leu Ser Lys Val Pro Lys Gly Phe Tyr Glu Gly Cys Thr Pro Ser Glu
                        260                 265                 270

Gly Pro Thr Glu Val Phe Lys Val Asn Val Ser Ser Arg Tyr Ala Ser
                        275                 280                 285

Phe Asp Leu Ile Ser Met Ala Gly Ser Thr Ser Leu Val Phe Ser Ile
                        290                 295                 300

Asp Glu His Pro Met Tyr Val Tyr Ala Val Asp Gly Arg Tyr Val Glu
        305                 310                 315                 320

Pro Leu Leu Val Asp Ala Val Thr Val Pro Val Ala Ala Arg Tyr Ser
                        325                 330                 335

Val Met Val Pro Leu Lys Ser Glu Asp Gln Ala Gly Asp Tyr Thr Val
                        340                 345                 350

Arg Val Ala Asn Asn Tyr Ala Asn Gln Val Ile Asn Gly Thr Gly Val
                        355                 360                 365

Leu Ser Tyr Asp Thr Ala Thr Pro Lys Gln Ile Gly Ser Ser Gln Pro
                    370                 375                 380

Tyr Ile Asn Glu Ala Gly Ser Asn Ala Thr Ala Thr Val Ile Leu
        385                 390                 395                 400

Asn Glu Thr Asp Val Val Pro Phe Pro Val Val Ala Pro Ala Lys Lys
                        405                 410                 415

Ala Asp Arg Thr Tyr Ile Leu Asn Val Glu Asn Ala Asn Ser Ser Tyr
                        420                 425                 430

Thr Trp Thr Leu Gly Asn Gln Tyr Pro Met Ser Asn Glu Glu Leu Asp
                        435                 440                 445

Pro Pro Val Leu Phe Asn Leu Ser Ser Ile Ser Gln Ala Tyr Ser Ala
                    450                 455                 460

Met Thr Met Asn Gly Thr Trp Val Asp Leu Ile Ile Asn Ile Thr Thr
        465                 470                 475                 480

Ser Gly Gln Pro Gln His Pro Ile His Lys His Ser Asn Lys Tyr Phe
                        485                 490                 495

Val Ile Gly Thr Gly Asn Gln Pro Phe Ile Trp Ser Ser Val Glu Glu
                        500                 505                 510

Ala Met Gln Glu Ile Pro Glu Asn Phe Asn Phe Glu Asn Pro Gln Met
                        515                 520                 525

Arg Asp Thr Phe Tyr Ser Pro Ser Ser Ala Thr Gly Pro Ser Trp Leu
                        530                 535                 540

Ala Met Arg Tyr His Ile Val Asn Pro Gly Pro Phe Leu Leu His Cys
        545                 550                 555                 560

His Leu Gln Met His His Val Gly Gly Leu Ala Leu Ala Leu Leu Asp
                        565                 570                 575
```

-continued

Gly Val Asp Ala Trp Pro Thr Asp Ile Pro Glu Gly Tyr Gln Leu Pro
            580                 585                 590

Val Met Pro Ile
        595

<210> SEQ ID NO 10
<211> LENGTH: 594
<212> TYPE: PRT
<213> ORGANISM: Aspergillus niger

<400> SEQUENCE: 10

Met Thr Ile Phe Leu Leu Leu Gly Leu Leu Ala Pro Leu Val Leu
1               5                   10                  15

Cys Ser Pro Ile Arg His Val Thr Pro His Leu Ser His Ser Thr Pro
                20                  25                  30

Ile Pro Arg Asp Met Gln Gly Asn Ser Ser Gln Ser Pro Asn Thr Pro
            35                  40                  45

Trp Gln Gly Tyr Asp Ile Asn Thr Asn Tyr Tyr Glu Thr Ile Pro Gln
    50                  55                  60

Thr Asn Val Val Arg Glu Tyr Trp Phe Asp Ile Val Asn Thr Thr Ala
65                  70                  75                  80

Ala Leu Asp Gly Val Glu Arg Pro Val Leu Leu Val Asn Gly Gln Phe
                85                  90                  95

Pro Gly Pro Thr Ile Glu Ala Asn Trp Gly Asp Thr Val Lys Val His
            100                 105                 110

Val Thr Asn Arg Met Glu Asn Asn Gly Thr Ala Ile His Phe His Gly
        115                 120                 125

Ile Arg Gln Leu Tyr Asn Asn Gln Met Asp Gly Val Ala Ala Leu Thr
    130                 135                 140

Gln Cys Pro Val Pro Pro Asn Ser Ser Tyr Thr Tyr Val Trp Arg Ala
145                 150                 155                 160

Glu Glu Tyr Gly Ser Ser Trp Tyr His Ser His Phe Ser Leu Gln Ala
                165                 170                 175

Trp Glu Gly Val Phe Gly Gly Ile Leu Ile His Gly Pro Ser Thr Ala
            180                 185                 190

Glu Tyr Asp His Asp Leu Gly Met Val Phe Leu Asn Asp Trp Ser His
        195                 200                 205

Gln Thr Val Asp Glu Met Tyr Gln Ser Val Leu Glu Ser Gln Asn Pro
    210                 215                 220

Pro His Phe Gln Thr Gly Leu Ile Asn Gly Ser Asn Ile Trp Val Thr
225                 230                 235                 240

Ala Asp Asn Gln Thr Val Gly Arg Arg Phe Gln Thr Glu Phe Val Pro
                245                 250                 255

Gly Gln Arg Tyr Arg Leu Arg Leu Val Asn Ala Ala Met His Thr His
            260                 265                 270

Phe Arg Phe Ser Ile Asp Asn His Asp Leu Thr Val Ile Ala Ser Asp
        275                 280                 285

Phe Val Pro Ile Val Pro Phe Thr Thr Asn Asn Val Pro Ile Gly Met
    290                 295                 300

Gly Gln Arg Tyr Asp Ile Ile Val Thr Ala Asn Ala Pro Asp Asn
305                 310                 315                 320

Tyr Trp Ile Arg Ala Ile Pro Gln Ser Phe Cys Ser Asp Asn Ala Asn
                325                 330                 335

Ser Asp Asn Ile Lys Gly Val Leu His Tyr Glu Gly Ala Ala Asp Asn

-continued

```
                    340                 345                 350
Ser Asp Pro Thr Ser Thr Lys Trp Asp Tyr Gly Asp Asp Ile Gln Cys
        355                 360                 365

Leu Asp Phe Ser Leu Asp Glu Leu Val Pro Trp Leu Ala Leu Asp Ala
        370                 375                 380

Asp Ile Gly Gly Ala Gln Met Ala Glu Ser Asp Val Asp Phe Thr Pro
385                 390                 395                 400

Phe Gly Asp Val Pro Leu Tyr Leu Trp Thr Met Gly Gly Asn Ala Leu
                405                 410                 415

Asn Ile Ser Trp Lys Asp Pro Thr Leu Gln Gln Thr Phe Glu Asp Pro
                420                 425                 430

Asp Lys Met Asp Trp Lys Ala Ser Gln Gly Val Ile Glu Ala Ala Ile
        435                 440                 445

Pro Asn Lys Trp Thr Val Leu Val Val Gln Thr Asp Leu Pro Val Pro
        450                 455                 460

His Pro Ile His Leu His Gly His Asp Phe Tyr Leu Leu Ala Gln Gly
465                 470                 475                 480

Phe Gly Gln Phe Asn Pro Gln Asn Val Thr Leu Lys Thr His Asn Pro
                485                 490                 495

Pro Arg Arg Asp Thr Ala Leu Met Thr Ala Ala Thr Pro Glu Asn Gly
                500                 505                 510

Gly Gly Gly Tyr Met Val Ile Gly Phe Pro Ala Asp Asn Pro Gly Val
            515                 520                 525

Trp Leu Ile His Cys His Ile Gly Phe His Ala Thr Glu Gly Phe Ala
        530                 535                 540

Gln Gln Ile Val Glu Arg Gln Ser Glu Phe Asn Thr Phe Phe Ser Glu
545                 550                 555                 560

Asp Leu Leu Glu Asn Thr Cys Asp Ala Trp Asp Glu Tyr Ala Lys Val
                565                 570                 575

Asn Pro Tyr Gly His Gln Tyr Arg Ala Leu Ala Gly Pro Tyr Glu Ser
            580                 585                 590

Gly Ile
```

CONTROLLED ENZYMATIC BROWNING OF A NON-MEAT PROTEIN CONTAINING MATERIAL

CROSS-REFERENCE TO RELATED APPLICATIONS

This application is a 35 U.S.C. 371 national application of international application no. PCT/EP2021/072012 filed Aug. 6, 2021, which claims priority or the benefit under 35 U.S.C. 119 of European application no. 20190047.9 filed Aug. 7, 2020, the contents of which are fully incorporated herein by reference.

REFERENCE TO SEQUENCE LISTING

This application contains a Sequence Listing in computer readable form. The computer readable form is incorporated herein by reference.

FIELD OF THE INVENTION

The present invention relates to controlled enzymatic browning of a meat analogue product comprising a red pigment which changes colour when oxidized.

BACKGROUND OF THE INVENTION

Consumer demand for foods containing proteins has increased due to the benefits of proteins, including providing satiety and building muscle mass.

Vegetarian diets in general, and vegetarian sources of protein in particular, have increased in popularity as consumer interest in healthier and more eco-friendly eating habits has grown. Meat substitutes have also increased in popularity as many consumers desire to continue making familiar, traditional, or favourite meals without meat or with less meat. Many known meat substitutes include plant-derived proteins, such as from soy beans.

Meat substitutes preferably mimic natural or processed meat products in any one or more of appearance, odour, flavour, texture, nutrient profile, and response to heating.

Extruded products are used extensively in the food industry. The extrusion is used primarily to give the food a specific texture and distinctive mouthfeel.

Dry-textured and wet-textured products have a water content of about 15% and 65%, respectively, and they possess a more or less strongly fibrous, meat-like structure depending on the process conditions. Dry- and wet extrusion methods are being used more and more often with plant proteins to provide sustainable alternatives to animal products.

An important target parameter for plant-based meat alternatives is the colour of the extrudates.

Coloration of non-meat protein materials for use in meat analogues, however, has proven difficult since meat changes colour as it is cooked. Uncoloured protein materials such as soy or pea protein have a beige or a tan colour, which does not resemble the red colour of uncooked meat and is lighter in colour than the brown colour of cooked meat. A meat analogue comprising such protein will therefore have a mottled appearance in both its uncooked and cooked states. This mottled appearance is less appealing and appetising because it does not appear "natural" to the consumer in either its uncooked state or its cooked state.

Meat has its red colour due to the presence of myoglobin which is absent in plant-based meat analogues. To mimic the red colour of raw meat, plant colorant is often added to meat analogues.

For example, U.S. Pat. No. 4,536,406 (General Foods Corp.) provides red meat analogue products formed of soy isolate protein and a red food colouring containing paprika and laccaic acid.

A common colorant today is beetroot containing the red pigment betanin.

When a conventional meat product is fried, browning reactions occur which can mostly be attributed to Maillard reactions and the breakdown of the tetrapyrrole ring of the muscle protein myoglobin. In plant-based meat analogues, the browning is mostly attributed to caramelization on the outer surface. This means that the outer surface of, e.g., a burger patty will more easily burn and become black and the core of the meat analogue burger patty comprising, e.g., betanin will remain red after cooking despite reaching a core temperature of more than 75° C.

Combinations of food colouring dyes have been used to provide colour to a protein material, so the colour of the protein material resembles the colour of a browning meat in both its uncooked and cooked states.

US2017/0303558A1 (Fraunhofer) discloses a coloured extruded plant protein product that contains plant protein and a secondary plant compound from oil seeds which contains polyphenols which change colour upon oxidation, such as sinapinic acid, chlorogenic acid, caffeic acid or secoisolariciresinol.

U.S. Pat. No. 3,958,019 (Armour and Co) provides a colour treatment for soy protein materials which gives the protein materials the colour of raw uncured meat, and which changes colour upon cooking to resemble the colour of cooked meat. The colour treatment is a mixture of betanin and canthaxanthin food pigments.

EP1180332A1 (Solae) discloses a composition for colouring a non-meat protein containing material which comprises a thermally unstable pigment such as betanin and a browning agent, preferably formed of a reducing sugar which is added in sufficient quantity to react with the amine groups of the protein material in a Maillard type reaction so the protein material browns by the same type of reaction, and to the same extent, as the browning of meat.

There is still a need for further development of methods for controlled browning of a non-meat protein containing material to more resemble meat both before and after cooking. Particularly desired are methods applying as few E-numbers as possible due to a general demand for a clean label, or which do not apply addition of e.g. sugar providing additional calories and working against the "no added sugar" trend.

WO2016/097270 (DSM) discloses the use of laccases having a specific prosite motif for bleaching food products, in particular dairy products. Use of laccase for bleaching of whey coloured with annatto from a cheddar cheese production is disclosed. Annatto is often used for colouring of cheese but the annatto that remains in the whey after the production of the cheese is undesirable.

JP2009165450 discloses use of a polyphenol-oxidizing enzyme to modify the colour of sekihan (rice boiled with red beans).

WO07097433 (Meiji) relates to a deodorizing composition for chewing gum which comprises an oxidoreductase. Preparation of capsules containing laccase suspended in hardened palm oil at 40° C. is disclosed.

JP2004321077 also relates to use of laccase in chewing gum to eliminate bad breath. The laccase is enclosed in a capsule which further comprises for example hydrogenated oil.

SUMMARY OF THE INVENTION

The present invention provides a means for a meat analogue product to resemble a browning meat in both an uncooked state and a cooked state.

The present inventors have found that when a red pigment which changes colour when oxidized is added together with an enzyme having laccase activity to a non-meat protein comprising material, such as a plant-based meat-analogue product, e.g. a burger patty, enzymatic oxidation of the red pigment facilitates meat-like browning of, e.g., the burger patty.

By using an enzyme, preferably an isolated enzyme, instead of, e.g., a further plant extract, the enzymatic activity can be easily controlled. Also, it is possible to select an enzyme having the right properties such as a temperature profile which matches the cooking conditions.

Therefore, the present invention relates to a non-meat protein containing material comprising a red pigment which changes colour when oxidized and an enzyme having laccase activity.

The invention also relates to a method for producing a non-meat protein containing material comprising:
  a) providing a material comprising non-meat protein; and
  b) adding to such material a red pigment which changes colour when oxidized and an enzyme having laccase activity.

The invention also relates to the use of an enzyme having laccase activity for controlled enzymatic browning of a non-meat protein containing material which comprises a red pigment which changes colour when oxidized.

The invention also relates to a composition for controlled enzymatic browning of a non-meat protein containing material which comprises a red pigment which changes colour when oxidized, said composition comprising an enzyme having laccase activity.

The invention also relates to a composition for controlled enzymatic browning of a non-meat protein containing material, said composition comprising a red pigment which changes colour when oxidized and an enzyme having laccase activity.

Preferably, the amino acid sequence of the enzyme having laccase activity comprises a sequence, such as a prosite sequence, consisting of W-Y-H-X-H-X(3)-Q-Y-X-D-G-X(2)-G, where X can be any of A, R, N, D, C, Q, E, G, H, I, L, K, M, F, P, S, T, W, Y or V.

In preferred embodiments, to further control that the browning primarily occurs during cooking, the enzyme having laccase activity is embedded in a fat having a melting temperature of at least 25° C., preferably 25-60° C. In this way the enzyme will only be released and get in contact with the red pigment in the non-meat protein containing material in a final cooking step and not during storage.

The invention also relates to a composition comprising an enzyme having laccase activity which is embedded in a fat having a melting temperature of at least 25° C.

DETAILED DESCRIPTION OF THE INVENTION

According to the invention, a red pigment which changes colour when oxidized and an enzyme having laccase activity is added to a non-meat protein containing material which may be used, e.g., as a meat analogue or a meat extender to make it brown in the same manner as a browning meat, and therefore colour similarly to a browning meat upon cooking. Browning meats, when cooked, undergo a Maillard reaction involving the condensation of an amine group and a reducing group to form intermediates which ultimately polymerise to form brown pigments (melanoidins) which give the cooked meat its brown colour.

The present invention relates to a non-meat protein containing material, such as a meat analogue product, comprising a red pigment which changes colour when oxidized and an enzyme having laccase activity.

In a preferred embodiment, the invention relates to meat analogue product comprising at least 50% w/w, preferably at least 70%, at least 90%, at least 95% or at least 98%, such as 100% w/w, plant protein out of total protein, which comprises a red pigment which changes colour when oxidized and an enzyme having laccase activity.

The invention also relates to a method for producing a non-meat protein containing material, such as a meat analogue product, comprising:
  a) providing a material comprising non-meat protein; and
  b) adding to such material a red pigment which changes colour when oxidized and an enzyme having laccase activity.

In a preferred embodiment, the invention relates to a method for producing a meat analogue product comprising:
  a) providing a material comprising at least 50% w/w, preferably at least 70%, at least 90%, at least 95% or at least 98%, such as 100% w/w, plant protein out of total protein; and
  b) adding to such material a red pigment which changes colour when oxidized and an enzyme having laccase activity.

The invention also relates to the use of an enzyme having laccase activity for controlled enzymatic browning of a non-meat protein containing material, such as a meat analogue product, which comprises a red pigment which changes colour when oxidized.

In a preferred embodiment, the invention relates to use of an enzyme having laccase activity for controlled enzymatic browning of a meat analogue product comprising at least 50% w/w, preferably at least 70%, at least 90%, at least 95% or at least 98%, such as 100% w/w, plant protein out of total protein and comprising a red pigment which changes colour when oxidized.

The invention also relates to a composition for controlled enzymatic browning of a non-meat protein containing material which comprises a red pigment which changes colour when oxidized, said composition comprising an enzyme having laccase activity.

The invention also relates to a composition for controlled enzymatic browning of a non-meat protein containing material, said composition comprising a red pigment which changes colour when oxidized and an enzyme having laccase activity.

A non-meat protein containing material is a material comprising non-meat protein. The material may also comprise meat protein. The non-meat protein containing material may be a mixture of non-meat protein and meat protein. In some preferred embodiments, the non-meat protein containing material comprises at least 50% w/w, preferably at least 70%, at least 90%, at least 95% or at least 98%, most preferably 100%, non-meat protein out of total protein. In some preferred embodiments, the non-meat protein containing material does not comprise meat protein. In some preferred embodiments, the non-meat protein containing material does not comprise animal-derived protein.

The non-meat protein may be plant protein or it may be non-meat protein obtained from other non-meat sources, e.g., algae, egg and/or dairy, e.g., whey protein and/or casein. The nonmeat protein may be a mixture of plant protein and non-meat protein obtained from other nonmeat sources. The protein in the non-meat protein containing material may be a mixture of protein obtained from one or more plants, or it may be a mixture of protein obtained from one or more plants and from one or more other sources, such as algae, egg, and/or dairy, e.g., whey protein or casein. In some preferred embodiments, the non-meat protein containing material comprises at least 50% w/w, preferably at least 70%, at least 90%, at least 95% or at least 98%, most preferably 100%, plant protein out of total protein.

In some embodiments, the non-meat protein containing material is a meat analogue product, e.g. a burger patty, such as a plant-based meat analogue product, e.g. a plant-based burger patty.

In some embodiments, the non-meat protein containing material is a meat analogue product selected among a minced-meat analogue product, a burger patty, a sausage, a meat-ball analogue product, and a gullasch meat analogue product, preferably a burger patty.

In some embodiments, the non-meat protein containing material is a plant-based meat analogue product selected among a minced-meat analogue product, a burger patty, a sausage, a meat-ball analogue product, and a gullasch meat analogue product, preferably a burger patty.

In some embodiments, the non-meat protein containing material is a plant protein containing material which comprises at least 50% w/w, preferably at least 70%, at least 90%, at least 95% or at least 98%, most preferably 100%, plant protein out of total protein.

In some embodiments, the non-meat protein containing material is a plant protein containing material, wherein at least 50% w/w, preferably at least 70%, at least 90%, at least 95% or at least 98%, such as 100%, of the plant protein is obtained from cereals (e.g. rice, corn, wheat, oat), pseudocereals (e.g. buckwheat, quinoa), tubers (e.g. potato), oilseeds (e.g. soybean, sunflower), legumes (e.g. pea, chickpea, lentils, lupin) or leaves (e.g. grass), preferably wherein at least 50% w/w, preferably at least 70%, at least 90%, at least 95% or at least 98%, such as 100%, of the plant protein is obtained from pea, soybeans or wheat, more preferably from pea, most preferably from yellow pea or green pea.

In some embodiments, the non-meat protein containing material is a plant protein containing material which comprises at least 50% w/w, preferably at least 70%, at least 90%, at least 95% or at least 98%, most preferably 100%, plant protein out of total protein, wherein at least 50% w/w, preferably at least 70%, at least 90%, at least 95% or at least 98%, such as 100%, of the plant protein is obtained from cereals (e.g. rice, corn, wheat, oat), pseudocereals (e.g. buckwheat, quinoa), tubers (e.g. potato), oilseeds (e.g. soybean, sunflower), legumes (e.g. pea, chickpea, lentils, lupin) or leaves (e.g. grass), preferably wherein at least 50% w/w, preferably at least 70%, at least 90%, at least 95% or at least 98%, such as 100%, of the plant protein is obtained from pea, soybeans or wheat, more preferably from pea, most preferably from yellow pea or green pea.

In some embodiments, the non-meat protein containing material has been extruded, preferably extruded and minced. In other embodiments, the non-meat protein containing material may have been texturized by any of a number of other known methods for texturising protein material to provide a meat-like texture to the non-meat protein containing material.

Typically, the non-meat protein material in the non-meat protein containing material has been extruded, minced and formulated with other ingredients such as potato starch or other starchy material, gums fibres, and/or salt. The extrusion and/or mincing of the non-meat protein may be performed before or after the formulation with other ingredients, preferably before. Or it may be performed after the addition of certain other ingredients, but not all.

The term "protein containing material" or "material comprising plant protein", as used herein, refers to both a material which is composed primarily only of protein and to a material which contains protein and other ingredients.

The non-meat protein in the non-meat protein containing material may be a plant protein material or an animal derived protein material. Animal derived non-meat protein materials that may be utilised include, but are not limited to, collagen protein, casein or caseinate proteins, whey protein and/or albumin. Plant protein materials which may be utilised include, but are not limited to, gluten materials, soy protein materials and/or pea protein materials. Most preferably the nonmeat protein in the non-meat protein containing material is a pea protein material such as pea protein isolate, pea protein concentrate, pea flour, pea flakes, or mixtures thereof, where the pea protein material preferably contains at least about 50% pea protein.

Such protein materials may be commercially available or may be manufactured.

The non-meat protein containing material, such as the meat analogue product, may also include adjuncts, including, but not limited to, starches, gums, and fibres, and mixtures thereof. The adjuncts may be included to impart various functionalities to the non-meat protein containing material to improve the meat-like characteristics of the non-meat protein containing material. For example, starch may be included in the non-meat protein containing material to increase the viscosity and gel forming capability of the non-meat protein containing material when it is hydrated. Gums may be included in the non-meat protein containing material to enhance the flowability. Fibres may be included in the non-meat protein containing material to enhance the structure when it is hydrated.

The non-meat protein containing material may have been hydrated with water in an amount of about 1 part to 4 parts water to about 1 part of the protein material, by weight. The red pigment and/or the enzyme may be mixed into the water before it is added.

Enough water should be added to facilitate the mixing of the pigment and the enzyme into the non-meat protein containing material, and excessive amounts of water should be avoided to ensure that the non-meat protein containing material absorbs the bulk of the pigment. The nonmeat protein containing material should be thoroughly mixed to hydrate and structure the nonmeat protein containing material, and so the pigment is well dispersed in the non-meat protein containing material to provide even coloration.

If desired, flavourings can be added to the non-meat protein containing material to provide a meat-like flavour.

According to the invention, a red pigment is included to give the non-meat protein containing material a colour resembling the red colour of an uncooked browning meat so the non-meat protein containing material will resemble the meat when uncooked. The red pigment to be used according to the invention changes colour when oxidized and when an enzyme having laccase activity is further added to the non-meat protein containing material, the red colour will gradually disappear upon cooking and the non-meat protein containing material will also resemble the meat when cooked.

The red pigment may have been extracted from fruit, leaves, flowers and/or roots of plants. A plant pigment is a type of coloured chemical substance produced by plants which absorb visible radiation between 380-780 nm. Betalains are a class of red-violet (betacyanins) and yellow (betaxanthins) pigments that are present in plants of caryophyllales. The common major sources of betalains are plants of amaranthacea, red beet, *bougainvillea*, cactacea.

The pigment betanin is derived from red beet (*Beta vulgaris*).

In some preferred embodiments, the red pigment is obtained from a plant, preferably from beetroot or amaranth grain.

In some preferred embodiments, the red pigment is betanin or amaranth pigment, preferably betanin obtained from beetroot or amaranth pigment obtained from amaranth grain.

Preferably the hydrated non-meat protein containing material contains from about 0.0005% to about 0.5%, by weight, of the pigment, such as 0.001% to about 0.1%, and more preferably from about 0.001% to about 0.05% of the pigment.

In some preferred embodiments, the red pigment is betanin in the form of beetroot juice or beetroot powder, preferably beetroot powder.

The non-meat protein containing material, such as the meat analogue product, may contain from about 0.5% to about 20%, by weight, of beetroot powder, such as from about 1% to about 10%.

The enzyme having laccase activity is preferable a laccase, more preferably a laccase classified as E.C. 1.10.3.2. Laccases (benzenediol: oxygen oxidoreductase, EC 1.10.3.2) are polyphenol oxidases containing copper atoms in the catalytic center and may be referred to as multicopper oxidases. Laccase-mediated catalysis typically occurs with reduction of oxygen to water accompanied by the oxidation of a substrate, which may be, e.g., a polyphenol, a methoxy-substituted phenol, an aromatic diamine, or any of a range of other compounds.

For purposes of the present invention, laccase activity may be determined spectrophotometrically using syringaldzine as a substrate which is oxidized to tetramethoxy azobismethylene quinone by the laccase. The rate of catalysis is measured at 540 nm.

Protein sequences can be classified into subclasses by conserved patterns determined from a sequence alignment. One such systematic pattern description is a prosite pattern or prosite sequence. I.e., a stretch of amino acids which is conserved in a subclass of protein sequences, such as a subclass of laccase enzymes.

In some embodiments of the invention, the amino acid sequence of the enzyme having laccase activity comprises a sequence, such as a prosite sequence, consisting of W-Y-H-X-H-X(3)-Q-YX-D-G-X(2)-G, where X can be any of A, R, N, D, C, Q, E, G, H, I, L, K, M, F, P, S, T, W, Y or V.

The numerical values (3) and (2) after X in the prosite sequence means that there are three or two amino acid residues, or in other words X(3) corresponds to X-X-X and X(2) corresponds to X-X. The amino acid residues are indicated with their IUPAC single letter code, wherein A=Alanine, R=Arginine, N=Asparagine, D=Aspartic acid, C=Cysteine, Q=Glutamine, E=Glutamic acid, G=glycine, H=Histidine, I=Isoleucine, L=Leucine, K=Lysine, M=Methionine, F=Phenylalanine, P=Proline, S=Serine, T=Threonine, W=Tryptophan, Y=Tyrosine, V=Valine.

In some embodiments of the invention, the amino acid sequence of the enzyme having laccase activity comprises a sequence, such as a prosite sequence, consisting of G-T-X-W-Y-H-X(5)-Q-Y, where X can be any of A, R, N, D, C, Q, E, G, H, I, L, K, M, F, P, S, T, W, Y or V.

In some embodiments, the amino acid sequence of the enzyme having laccase activity comprises a sequence, such as a prosite sequence, consisting of [IL]-X-D-[YW]-[YFNM]-[YHG], where [IL] means that the amino acid can be either I or L, [YW] means that the amino acid can be either Y or W, [YFNM] means that the amino acid can be either Y, F, N or M, [YHG] means that the amino acid can be either Y, H or G, and X can be any of A, R, N, D, C, Q, E, G, H, I, L, K, M, F, P, S, T, W, Y or V.

In some embodiments, the enzyme having laccase activity has at least 20%, e.g., at least 40%, at least 50%, at least 60%, at least 70%, at least 80%, at least 90%, or at least 95% of the laccase activity of the mature polypeptide of SEQ ID NO: 1.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to the mature polypeptide of any of SEQ ID NOs: 1-8. In some embodiments, the enzyme having laccase activity differs by up to 10 amino acids, e.g., 1, 2, 3, 4, 5, 6, 7, 8, 9, or 10, from the mature polypeptide of any of SEQ ID NOs: 1-8.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to the mature polypeptide of any of SEQ ID NOs: 1-4. In some embodiments, the enzyme having laccase activity differs by up to 10 amino acids, e.g., 1, 2, 3, 4, 5, 6, 7, 8, 9, or 10, from the mature polypeptide of any of SEQ ID NOs: 1-4.

For purposes of the present invention, the sequence identity between two amino acid sequences is determined as the output of "longest identity" using the Needleman-Wunsch algorithm (Needleman and Wunsch, 1970, J. Mol. Biol. 48: 443-453) as implemented in the Needle program of the EMBOSS package (EMBOSS: The European Molecular Biology Open Software Suite, Rice et al., 2000, Trends Genet. 16: 276-277), preferably version 6.6.0 or later. The parameters used are a gap open penalty of 10, a gap extension penalty of 0.5, and the EBLOSUM62 (EMBOSS version of BLOSUM62) substitution matrix. In order for the Needle program to report the longest identity, the -nobrief option must be specified in the command line. The output of Needle labeled "longest identity" is calculated as follows:

(Identical Residues×100)/(Length of Alignment−
Total Number of Gaps in Alignment)

The term "mature polypeptide" means a polypeptide in its mature form following N terminal processing (e.g., removal of signal peptide). In some embodiments, the mature polypeptide of SEQ ID NO: 1 has the amino acid sequence of SEQ ID NO: 1. In some embodiments, the mature polypeptide of SEQ ID NO: 2 has the amino acid sequence of SEQ ID NO: 2. In some embodiments, the mature polypeptide of SEQ ID NO: 3 has the amino acid sequence of SEQ ID NO: 3. In some embodiments, the mature polypeptide of SEQ ID NO: 4 has the amino acid sequence of SEQ ID NO: 4.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to a polypeptide having the amino acid sequence of any of SEQ ID NOs: 1-4. In some embodiments, the enzyme having laccase activity differs by up to 10 amino acids, e.g., 1, 2, 3, 4, 5, 6, 7, 8, 9, or 10, from a polypeptide having the amino acid sequence of any of SEQ ID NOs: 1-4.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to a polypeptide having the amino acid sequence of SEQ ID NO: 1. In some embodiments, the enzyme having laccase activity is obtained from *Myceliophthora* preferably from *Myceliophthora thermophila*.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to a polypeptide having the amino acid sequence of SEQ ID NO: 2. In some embodiments, the enzyme having laccase activity is obtained from *Rhizoctonia* preferably from *Rhizoctonia solani*.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to a polypeptide having the amino acid sequence of SEQ ID NO: 3. In some embodiments, the enzyme having laccase activity is obtained from *Coprinus* preferably from *Coprinus cinereus*.

In some embodiments, the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to a polypeptide having the amino acid sequence of SEQ ID NO: 4. In some embodiments, the enzyme having laccase activity is obtained from *Polyporus* preferably from *Polyporus pinsitus*.

The enzyme having laccase activity may be obtained from microorganisms, e.g., bacteria or fungi, of any genus or from, e.g., plants or insects. For purposes of the present invention, the term "obtained from" as used herein in connection with a given source shall mean that the polypeptide encoded by a polynucleotide is produced by the source or by a strain in which the polynucleotide from the source has been inserted. In some embodiments, the enzyme obtained from a given source is secreted extracellularly.

In some embodiments, the enzyme having laccase activity is recombinantly produced. In some embodiments, the enzyme having laccase activity is heterologous to the recombinant host cell. The host cell may be any microbial or plant cell useful in the recombinant production of the enzyme having laccase activity, e.g., a prokaryotic cell or a fungal cell.

In preferred embodiments, the enzyme having laccase activity is isolated. The term "isolated" may mean that the enzyme is separated from at least one other material or component with which it is naturally associated as found in nature, including but not limited to, for example, other proteins, nucleic acids, cells, etc. An isolated enzyme includes, but is not limited to, a culture broth containing the secreted enzyme. The term "isolated" may mean that the enzyme is largely separated from the cells in which it was expressed, e.g., after application of a purification or enrichment technique such as centrifugation or filtration.

In preferred embodiments, the enzyme having laccase activity is purified. The term "purified" may mean that the enzyme is substantially free from other components as determined by analytical techniques well known in the art (e.g., a purified enzyme may form a discrete band in an electrophoretic gel, chromatographic eluate, and/or a media subjected to density gradient centrifugation). A purified enzyme may be at least 50% pure, such as at least 60%, 65%, 70%, 75%, 80%, 85%, 90%, or 95% pure (e.g., percent by weight). The term "purified" may mean that the enzyme is present in a composition at a relative or absolute concentration that is higher than a starting composition, such as a fermentation broth from which the enzyme is obtained.

In preferred embodiments, the concentration of the enzyme having laccase activity is 0.1-100 mg EP/kg non-meat protein containing material, preferably 0.5-50 mg EP/kg, such as 1-20 mg EP/kg. EP is enzyme protein.

The amounts of each of the red pigment and the enzyme may be varied to adapt the colour of the non-meat protein containing material to the desired colour.

The red pigment which changes colour when oxidized and the enzyme having laccase activity may be added to the non-meat protein containing material as a dry powder or in an aqueous solution. In some embodiments, the dry pigment and the non-meat protein containing material may be dispersed together in water for hydrating the non-meat protein containing material.

In preferred embodiments, the enzyme having laccase activity is embedded in a fat having a melting temperature of at least 25° C., preferably 25-60° C., more preferably 25-40° C., most preferably 30-40° C.

The fat preferably has a melting temperature which is higher than room temperature.

Typically, a plant-based fat may be melting over a temperature range. Coconut fat which is also often referred to as coconut oil may have a melting temperature of, e.g., 27-31° C. However, this range may vary depending on the type of coconut fat.

Palm oil may have a melting temperature of, e.g., 37-60° C. depending on whether it is hydrogenated or non-hydrogenated.

In the context of the present invention, the terms coconut fat and coconut oil are used interchangeably, and so are the terms palm fat and palm oil.

In some preferred embodiments, the fat is a plant-based fat, preferably coconut oil or palm oil.

The enzyme having laccase activity may be embedded in the fat by melting the fat and mixing the enzyme into the melted fat. The solid fat comprising the enzyme may be blended into the non-meat containing material by a meat mixer.

The non-meat protein containing material, preferably texturised and/or flavoured, comprising the red dye and the enzyme may be used as a meat analogue. In one aspect of the invention, the non-meat protein containing material comprising the red dye and the enzyme may be formed into patties or stuffed into casings to form a meat analogue patty or sausage. The meat analogue patties and sausages may be cooked, for example by frying or broiling, at temperatures, and for a time period effective to cook the meat analogue, for example from about 50° C. to about 260° C.

The invention also relates to a composition comprising an enzyme having laccase activity which is embedded in a fat having a melting temperature of at least 25° C., preferably 25-60° C., more preferably 25-40° C., most preferably 30-40° C. Preferably, the fat is a plant-based fat, more preferably coconut oil or palm oil. The enzyme having laccase activity is preferably isolated and/or purified. The enzyme having laccase activity is preferably a laccase, more preferably a laccase classified as E.C. 1.10.3.2

PREFERRED EMBODIMENTS

1. A meat analogue product comprising at least 50% w/w, preferably at least 70%, at least 90%, at least 95% or at least 98%, such as 100% w/w, plant protein out of total protein, which comprises a red pigment which changes colour when oxidized and an enzyme having laccase activity.

2. A method for producing a meat analogue product comprising:
   a) providing a material comprising at least 50% w/w, preferably at least 70%, at least 90%, at least 95% or at least 98%, such as 100% w/w, plant protein out of total protein; and
   b) adding to such material a red pigment which changes colour when oxidized and an enzyme having laccase activity.

3. Use of an enzyme having laccase activity for controlled enzymatic browning of a meat analogue product comprising at least 50% w/w, preferably at least 70%, at least 90%, at least 95% or at least 98%, such as 100% w/w, plant protein out of total protein and comprising a red pigment which changes colour when oxidized.

4. The meat analogue product, method or use of any of the preceding embodiments, wherein the amino acid sequence of the enzyme having laccase activity comprises a sequence, such as a prosite sequence, consisting of W-Y-H-X-H-X(3)-Q-Y-X-D-G-X(2)-G, where X can be any of A, R, N, D, C, Q, E, G, H, I, L, K, M, F, P, S, T, W, Y or V.

5. The meat analogue product, method or use of any of the preceding embodiments, wherein the enzyme having laccase activity is embedded in a fat having a melting temperature of at least 25° C., preferably 25-60° C., more preferably 25-40° C., most preferably 30-40° C.

6. The meat analogue product, method or use of the preceding embodiment, wherein the fat is a plant-based fat, preferably coconut oil or palm oil.

7. The meat analogue product, method or use of any of the preceding embodiments, wherein the red pigment is obtained from a plant, preferably from beetroot or amaranth grain.

8. The meat analogue product, method or use of any of the preceding embodiments, wherein the red pigment is betanin or amaranth pigment, preferably betanin obtained from beetroot or amaranth pigment obtained from amaranth grain.

9. The meat analogue product, method or use of any of the preceding embodiments, wherein the red pigment is betanin in the form of beetroot juice or beetroot powder, preferably beetroot powder.

10. The meat analogue product, method or use of any of the preceding embodiments, wherein the meat analogue product is selected among a minced-meat analogue product, a burger patty, a sausage, a meat-ball analogue product, and a gullasch meat analogue product, preferably a burger patty.

11. The meat analogue product, method or use of the preceding embodiment, wherein at least 50% w/w, preferably at least 70%, at least 90%, at least 95% or at least 98%, such as 100%, of the plant protein is obtained from cereals, e.g. rice, corn, wheat, oat; pseudocereals, e.g. buckwheat, quinoa; tubers, e.g. potato; oilseeds, e.g. soybean, sunflower; legumes, e.g. pea, chickpea, lentils, lupin; or leaves, e.g. grass; preferably wherein at least 50% w/w, preferably at least 70%, at least 90%, at least 95% or at least 98%, such as 100%, of the plant protein is obtained from pea, soybean or wheat, more preferably from pea, most preferably from yellow pea or green pea.

12. The meat analogue product, method or use of any of the preceding embodiments, wherein the plant protein has been extruded, preferably extruded and minced.

13. The meat analogue product, method or use of any of the preceding embodiments, wherein the enzyme having laccase activity is isolated.

14. The meat analogue product, method or use of any of the preceding embodiments, wherein the enzyme having laccase activity is a laccase, preferably a laccase classified as E.C. 1.10.3.2

15. The meat analogue product, method or use of any of the preceding embodiments, wherein the concentration of the enzyme having laccase activity is 0.1-100 mg EP/kg meat analogue product, preferably 0.5-50 mg EP/kg, such as 1-20 mg EP/kg.

16. The meat analogue product, method or use of any of the preceding embodiments, wherein the enzyme having laccase activity is purified.

17. A non-meat protein containing material comprising a red pigment which changes colour when oxidized and an enzyme having laccase activity.

18. A method for producing a non-meat protein containing material comprising:
   a) providing a material comprising non-meat protein; and
   b) adding to such material a red pigment which changes colour when oxidized and an enzyme having laccase activity.

19. Use of an enzyme having laccase activity for controlled enzymatic browning of a nonmeat protein containing material which comprises a red pigment which changes colour when oxidized.

20. A composition for controlled enzymatic browning of a non-meat protein containing material which comprises a red pigment which changes colour when oxidized, said composition comprising an enzyme having laccase activity.

21. A composition for controlled enzymatic browning of a non-meat protein containing material, said composition comprising a red pigment which changes colour when oxidized and an enzyme having laccase activity.

22. The composition, material, method or use of any of the five preceding embodiments, wherein the enzyme having laccase activity is embedded in a fat having a melting temperature of at least 25° C., preferably 25-60° C., more preferably 25-40° C., most preferably 30-40° C.

23. The composition, material, method or use of the preceding embodiment, wherein the fat is a plant-based fat, preferably coconut oil or palm oil.

24. The composition, material, method or use of any of the seven preceding embodiments, wherein the red pigment is obtained from a plant, preferably from beetroot or amaranth grain.

25. The composition, material, method or use of any of the eight preceding embodiments, wherein the red pigment is betanin or amaranth pigment, preferably betanin obtained from beetroot or amaranth pigment obtained from amaranth grain.

26. The composition, material, method or use of any of the nine preceding embodiments, wherein the red pigment is betanin in the form of beetroot juice or beetroot powder, preferably beetroot powder.

27. The composition, material, method or use of any of the ten preceding embodiments, wherein the non-meat protein containing material is a plant-based meat analogue product, such as a plant-based burger patty.

28. The composition, material, method or use of any of the eleven preceding embodiments, wherein the non-meat protein containing material is a plant protein containing material which comprises at least 50% w/w, preferably at least 70%, at least 90%, at least 95% or at least 98%, such as 100%, plant protein out of total protein.

29. The composition, material, method or use of the twelve preceding embodiment, wherein at least 50% w/w, preferably at least 70%, at least 90%, at least 95% or at least 98%, such as 100%, of the plant protein is obtained from cereals, e.g. rice, corn, wheat, oat; pseudocereals, e.g. buckwheat, quinoa; tubers, e.g. potato; oilseeds, e.g. soybean, sunflower; legumes, e.g. pea, chickpea, lentils, lupin; or leaves, e.g. grass; preferably wherein at least 50% w/w, preferably at least 70%, at least 90%, at least 95% or at least 98%, such as 100%, of the plant protein is obtained from pea, soybeans or wheat, more preferably from pea, most preferably from yellow pea or green pea.

30. The composition, material, method or use of any of the thirteen preceding embodiments, wherein the non-meat protein in the non-meat protein containing material has been extruded, preferably extruded and minced.

31. The composition, material, method or use of any of the fourteen preceding embodiments, wherein the enzyme having laccase activity is isolated.

32. A non-meat protein containing material comprising a red pigment which changes colour when oxidized and an enzyme having laccase activity.

33. The material of the preceding embodiment, wherein the enzyme having laccase activity is embedded in a fat having a melting temperature of at least 25° C., preferably 25-60° C., more preferably 25-40° C., most preferably 30-40° C.

34. The material of the preceding embodiment, wherein the fat is a plant-based fat, preferably coconut oil or palm oil.

35. The material of any of the three preceding embodiments, wherein the red pigment is obtained from a plant, preferably from beetroot or amaranth grain.

36. The material of any of the four preceding embodiments, wherein the red pigment is betanin or amaranth pigment, preferably betanin obtained from beetroot or amaranth pigment obtained from amaranth grain.

37. The material of any of the five preceding embodiments, wherein the red pigment is betanin in the form of beetroot juice or beetroot powder, preferably beetroot powder.

38. The material of any of the six preceding embodiments which is a plant-based meat analogue product, such as a plant-based burger patty.

39. The material of any of the seven preceding embodiments which is a plant-based meat analogue product selected among a minced-meat analogue product, a burger patty, a sausage, a meat-ball analogue product, and a gullasch meat analogue product, preferably a burger patty.

40. The material of any of the eight preceding embodiments which is a plant protein containing material which comprises at least 50% w/w, preferably at least 70%, at least 90%, at least 95% or at least 98%, such as 100%, plant protein out of total protein.

41. The material of the preceding embodiment, wherein at least 50% w/w, preferably at least 70%, at least 90%, at least 95% or at least 98%, such as 100%, of the plant protein is obtained from cereals (e.g. rice, corn, wheat, oat), pseudocereals (e.g. buckwheat, quinoa), tubers (e.g. potato), oilseeds (e.g. soybean, sunflower), legumes (e.g. pea, chickpea, lentils, lupin) or leaves (e.g. grass), preferably wherein at least 50% w/w, preferably at least 70%, at least 90%, at least 95% or at least 98%, such as 100%, of the plant protein is obtained from pea, soybeans or wheat, more preferably from pea, most preferably from yellow pea or green pea.

42. The material of any of the ten preceding embodiments which has been extruded, preferably extruded and minced.

43. The material of any of the eleven preceding embodiments, wherein the enzyme having laccase activity is isolated.

44. The material of any of the twelve preceding embodiments, wherein the enzyme having laccase activity is purified.

45. The material of any of the thirteen preceding embodiments, wherein the enzyme having laccase activity is a laccase, preferably a laccase classified as E.C. 1.10.3.2.

46. The material of any of the fourteen preceding embodiments, wherein the concentration of the enzyme having laccase activity is 0.1-100 mg EP/kg non-meat protein containing material, preferably 0.5-50 mg EP/kg, such as 1-20 mg EP/kg.

47. A method for producing a non-meat protein containing material comprising:
   a) providing a material comprising non-meat protein; and
   b) adding to such material a red pigment which changes colour when oxidized and an enzyme having laccase activity.

48. The method of the preceding embodiment, wherein the enzyme having laccase activity is embedded in a fat having a melting temperature of at least 25° C., preferably 25-60° C., more preferably 25-40° C., most preferably 30-40° C.

49. The method of the preceding embodiment, wherein the fat is a plant-based fat, preferably coconut oil or palm oil.

50. The method of any of the three preceding embodiments, wherein the red pigment is obtained from a plant, preferably from beetroot or amaranth grain.

51. The method of any of the four preceding embodiments, wherein the red pigment is betanin or amaranth pigment, preferably betanin obtained from beetroot or amaranth pigment obtained from amaranth grain.

52. The method of any of the five preceding embodiments, wherein the red pigment is betanin in the form of beetroot juice or beetroot powder, preferably beetroot powder.

53. The method of any of the six preceding embodiments, wherein the non-meat protein containing material is a plant-based meat analogue product, such as a plant-based burger patty.

54. The method of any of the seven preceding embodiments, wherein the non-meat protein containing material is a plant-based meat analogue product selected among a minced-meat analogue product, a burger patty, a sausage, a meat-ball analogue product, and a gullasch meat analogue product, preferably a burger patty.

55. The method of any of the eight preceding embodiments, wherein the non-meat protein containing material is a plant protein containing material which comprises at least 50% w/w, preferably at least 70%, at least 90%, at least 95% or at least 98%, such as 100%, plant protein out of total protein.

56. The method of the preceding embodiment, wherein at least 50% w/w, preferably at least 70%, at least 90%, at least 95% or at least 98%, such as 100%, of the plant protein is obtained from cereals (e.g. rice, corn, wheat, oat), pseudo-cereals (e.g. buckwheat, quinoa), tubers (e.g. potato), oil-seeds (e.g. soybean, sunflower), legumes (e.g. pea, chickpea, lentils, lupin) or leaves (e.g. grass), preferably wherein at least 50% w/w, preferably at least 70%, at least 90%, at least 95% or at least 98%, such as 100%, of the plant protein is obtained from pea, soybeans or wheat, more preferably from pea, most preferably from yellow pea or green pea.

57. The method of any of the ten preceding embodiments, wherein the non-meat protein in the non-meat protein containing material has been extruded, preferably extruded and minced.

58. The method of any of the eleven preceding embodiments, wherein the enzyme having laccase activity is isolated.

59. The method of any of the twelve preceding embodiments, wherein the enzyme having laccase activity is purified.

60. The method of any of the thirteen preceding embodiments, wherein the enzyme having laccase activity is a laccase, preferably a laccase classified as E.C. 1.10.3.2.

61. The method of any of the fourteen preceding embodiments, wherein the concentration of the enzyme having laccase activity is 0.1-100 mg EP/kg non-meat protein containing material, preferably 0.5-50 mg EP/kg, such as 1-20 mg EP/kg.

62. Use of an enzyme having laccase activity for controlled enzymatic browning of a nonmeat protein containing material which comprises a red pigment which changes colour when oxidized.

63. The use of the preceding embodiment, wherein the enzyme having laccase activity is embedded in a fat having a melting temperature of at least 25° C., preferably 25-60° C., more preferably 25-40° C., most preferably 30-40° C.

64. The use of the preceding embodiment, wherein the fat is a plant-based fat, preferably coconut oil or palm oil.

65. The use of any of the three preceding embodiments, wherein the red pigment is obtained from a plant, preferably from beetroot or amaranth grain.

66. The use of any of the four preceding embodiments, wherein the red pigment is betanin or amaranth pigment, preferably betanin obtained from beetroot or amaranth pigment obtained from amaranth grain.

67. The use of any of the five preceding embodiments, wherein the red pigment is betanin in the form of beetroot juice or beetroot powder, preferably beetroot powder.

68. The use of any of the six preceding embodiments, wherein the non-meat protein containing material is a plant-based meat analogue product, such as a plant-based burger patty.

69. The use of any of the seven preceding embodiments, wherein the non-meat protein containing material is a plant-based meat analogue product selected among a minced-meat analogue product, a burger patty, a sausage, a meat-ball analogue product, and a gullasch meat analogue product, preferably a burger patty.

70. The use of any of the eight preceding embodiments, wherein the non-meat protein containing material is a plant protein containing material which comprises at least 50% w/w, preferably at least 70%, at least 90%, at least 95% or at least 98%, such as 100%, plant protein out of total protein.

71. The use of the preceding embodiment, wherein at least 50% w/w, preferably at least 70%, at least 90%, at least 95% or at least 98%, such as 100%, of the plant protein is obtained from cereals (e.g. rice, corn, wheat, oat), pseudo-cereals (e.g. buckwheat, quinoa), tubers (e.g. potato), oil-seeds (e.g. soybean, sunflower), legumes (e.g. pea, chickpea, lentils, lupin) or leaves (e.g. grass), preferably wherein at least 50% w/w, preferably at least 70%, at least 90%, at least 95% or at least 98%, such as 100%, of the plant protein is obtained from pea, soybeans or wheat, more preferably from pea, most preferably from yellow pea or green pea.

72. The use of any of the ten preceding embodiments, wherein the non-meat protein in the non-meat protein containing material has been extruded, preferably extruded and minced.

73. The use of any of the eleven preceding embodiments, wherein the enzyme having laccase activity is isolated.

74. The use of any of the twelve preceding embodiments, wherein the enzyme having laccase activity is purified.

75. The use of any of the thirteen preceding embodiments, wherein the enzyme having laccase activity is a laccase, preferably a laccase classified as E.C. 1.10.3.2.

76. The use of any of the fourteen preceding embodiments, wherein the concentration of the enzyme having laccase activity is 0.1-100 mg EP/kg non-meat protein containing material, preferably 0.5-50 mg EP/kg, such as 1-20 mg EP/kg.

77. A composition for controlled enzymatic browning of a non-meat protein containing material, said composition comprising a red pigment which changes colour when oxidized and an enzyme having laccase activity.

78. The composition of the preceding embodiment, wherein the enzyme having laccase activity is embedded in a fat having a melting temperature of at least 25° C., preferably 25-60° C., more preferably 25-40° C., most preferably 30-40° C.

79. The composition of the preceding embodiment, wherein the fat is a plant-based fat, preferably coconut oil or palm oil.

80. The composition of any of the three preceding embodiments, wherein the red pigment is obtained from a plant, preferably from beetroot or amaranth grain.

81. The composition of any of the four preceding embodiments, wherein the red pigment is betanin or amaranth pigment, preferably betanin obtained from beetroot or amaranth pigment obtained from amaranth grain.

82. The composition of any of the five preceding embodiments, wherein the red pigment is betanin in the form of beetroot juice or beetroot powder, preferably beetroot powder.

83. The composition of any of the six preceding embodiments, wherein the enzyme having laccase activity is isolated.

84. The composition of any of the seven preceding embodiments, wherein the enzyme having laccase activity is purified.

85. The composition of any of the eight preceding embodiments, wherein the enzyme having laccase activity is a laccase, preferably a laccase classified as E.C. 1.10.3.2.

86. A composition comprising an enzyme having laccase activity which is embedded in a fat having a melting temperature of at least 25° C., preferably 25-60° C., more preferably 25-40° C., most preferably 30-40° C.

87. The composition of the preceding embodiment, wherein the fat is a plant-based fat, preferably coconut oil or palm oil.

88. The composition of any of the two preceding embodiments, wherein the enzyme having laccase activity is isolated.

89. The composition of any of the three preceding embodiments, wherein the enzyme having laccase activity is purified.

90. The composition of any of the four preceding embodiments, wherein the enzyme having laccase activity is a laccase, preferably a laccase classified as E.C. 1.10.3.2.

91. The meat analogue product, method, use, material or composition of any of the preceding embodiments, wherein the amino acid sequence of the enzyme having laccase activity comprises a sequence, such as a prosite sequence, consisting of W-Y-H-X-H-X(3)-Q-YX-D-G-X(2)-G, where X can be any of A, R, N, D, C, Q, E, G, H, I, L, K, M, F, P, S, T, W, Y or V.

92. The meat analogue product, method, use, material or composition of any of the preceding embodiments, wherein the amino acid sequence of the enzyme having laccase activity comprises a sequence, such as a prosite sequence, consisting of G-T-X-W-Y-H-X(5)-Q-Y, where X can be any of A, R, N, D, C, Q, E, G, H, I, L, K, M, F, P, S, T, W, Y or V.

93. The meat analogue product, method, use, material or composition of any of the preceding embodiments, wherein the amino acid sequence of the enzyme having laccase activity comprises a sequence, such as a prosite sequence, consisting of [IL]-X-D-[YW]-[YFNM]-[YHG], where [IL] means that the amino acid can be either I or L, [YW] means that the amino acid can be either Y or W, [YFNM] means that the amino acid can be either Y, F, N or M, [YHG] means that the amino acid can be either Y, H or G, and X can be any of A, R, N, D, C, Q, E, G, H, I, L, K, M, F, P, S, T, W, Y or V.

94. The meat analogue product, method, use, material or composition of any of the preceding embodiments, wherein the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to the mature polypeptide of any of SEQ ID NOs: 1-8.

95. The meat analogue product, method, use, material or composition of any of the preceding embodiments, wherein the enzyme having laccase activity has a sequence identity of at least 60%, e.g., at least 65%, at least 70%, at least 75%, at least 80%, at least 81%, at least 82%, at least 83%, at least 84%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, or 100% to the polypeptide of any of SEQ ID NOs: 1-4.

96. The meat analogue product, method, use, material or composition of any of the preceding embodiments, wherein the enzyme having laccase activity differs by up to 10 amino acids, e.g., 1, 2, 3, 4, 5, 6, 7, 8, 9, or 10, from the mature polypeptide of any of SEQ ID NOs: 1-8.

97. The meat analogue product, method, use, material or composition of any of the preceding embodiments, wherein the enzyme having laccase activity differs by up to 10 amino acids, e.g., 1, 2, 3, 4, 5, 6, 7, 8, 9, or 10, from the polypeptide of any of SEQ ID NOs: 1-4.

EXAMPLES

Example 1

Enzymatic Conversion of the Red Colour of Beetroot Juice into Brown

Beetroot juice (1%) was prepared by solubilising beetroot powder (1%) in a 50 mM MES buffer (pH 6.3). 10 mg/l of the enzymes shown in Table 1 was added to the beetroot juice and incubated for 10 minutes. The MtL laccase, formulated is laccase from *Myceliophthora thermophila* formulated in 95% polyols. The absorbance at 350 and 530 nm was measured in a spectrophotometer and the decrease in the 530/350 nm ratio was used as a measure of browning.

TABLE 1

| Enzymes tested (10 mg/l) | Abs 530/350 nm |
|---|---|
| No enzyme | 1.2 |
| MtL laccase, formulated | 0.6 |
| RsL laccase, Rhizoctonia solani | 0.7 |
| CcL laccase, Coprinus cinereus | 0.7 |
| MtL laccase, Myceliophthora thermophila | 0.6 |
| PpL laccase, Polyporus pinsitus/Trametes villosa | 0.5 |
| Gluzyme (GOX), *Aspergillus niger* | 1.2 |
| MnCox oxidase, Microdochium nivale | 1.2 |
| Cip peroxidase, Coprinus cinereus | 1.2 |
| Tyrosinase, Diplodia seriata | 1.2 |

All laccases tested show the ability to convert the red colour of beetroot juice into brown. The last four enzymes in the table are non-laccase type oxidases which appear to not have this ability including the monophenol monooxidase, tyrosinase.

Example 2

Low Level of Oxidation at 4° C. May Cause Unwanted Browning

Despite the temperature optimum of the laccase being 50-60° C., a low level of oxidation at 4° C. may cause unwanted browning during cold storage prior to cooking. A plant-based burger patty was prepared by mixing 50 g of texturized pea protein (extruded yellow pea protein isolate) presoaked in 90 g of water, 2.4 g potato starch, 1.4 g salt and 10 g beetroot powder. For each patty, 20 g was weighed out and a patty of 4.5 cm in diameter was formed. Either no laccase, or 14.3 mg EP/kg or 1.24 mg EP/kg of the MtL laccase was added per patty. The patties were stored for 24 h at 4° C. and visually inspected for browning. Some browning was observed at the low dosage and significant browning was observed at the high dosage.

TABLE 2

| Laccase added (mg EP/kg) | 0 | 1.24 | 14.3 |
|---|---|---|---|
| Degree of browning | − | + | +++ |

Example 3

Formulation of Laccase in Plant-Based Fat

To ensure browning only occurs during cooking and not prior during storage, the laccase was formulated in fat having a melting temperature between 30-40° C. This will ensure that the browning catalysed by the laccase only occurs in the right temperature interval (40-75° C.) when the laccase is released into the burger patty. Coconut oil having a melting point of about 30° C. was melted at 40° C. and 0.3 mg EP/ml MtL laccase mixed with the liquid oil. 50 µl of solidified oil with or without laccase was aliquoted in an Eppendorf tube, 1 ml of beetroot juice (1%) added and incubated at the stated temperature for 50 min.

TABLE 3

| Temperature (° C.) | No enzyme (530/350 nm) | Laccase (530/350 nm) |
|---|---|---|
| 15 | 1.6 | 1.6 |
| 25 | 1.5 | 1.5 |
| 35 | 1.5 | 1.5 |
| 45 | 1.5 | 1.4 |
| 55 | 1.3 | 0.5 |
| 65 | 1.0 | 0.6 |
| 75 | 0.7 | 0.6 |
| 85 | 0.4 | 0.4 |
| 95 | 0.2 | 0.2 |

An increase in the enzymatically catalysed browning is observed between 45-75° C.

Example 4

Formulation in Plant-Based Fat Vs. Non-Formulated Laccase

Coconut oil was melted at 40° C. and 0.3 mg EP/ml MtL laccase mixed with the liquid oil. 50 µl of solidified fat was added as 10×5 µl spheres. After solidification 1 ml of 1% beetroot juice was added and incubated at either 4° C. or 60° C. In the control similar concentration of laccase was added directly to the tube. The rate of browning by the laccase formulated in the 5 µl droplets was similar to laccase added directly to the beetroot juice at 65° C., hence, formulation in fat has only a minor negative effect on the rate of catalysis at cooking temperature. In contrast, at cold storage temperature before cooking (4° C.), the rate of browning was significantly lower when the laccase was formulated in fat.

TABLE 4

| Rate of browning at 65° C. | | | |
|---|---|---|---|
| Time (min) | Control (530/350 nm) | Laccase (530/350 nm) | Laccase in fat (530/350 nm) |
| 0 | 1.5 | 1.5 | 1.5 |
| 5 | 1.5 | 0.6 | 0.6 |
| 10 | 1.4 | 0.5 | 0.6 |
| 20 | 1.3 | 0.4 | 0.5 |
| 40 | 1.2 | 0.3 | 0.3 |
| 80 | 1.0 | 0.2 | 0.2 |

Table 4 shows that the rate of browning at 65° C. was similar for the laccase added directly and the laccase formulated in fat.

TABLE 5

| Rate of browning at 4° C. | | | |
|---|---|---|---|
| Time (h) | Control (530/350 nm) | Laccase (530/350 nm) | Laccase in fat (530/350 nm) |
| 0 | 1.6 | 1.6 | 1.6 |
| 24 | 1.5 | 0.5 | 1.0 |
| 48 | 1.5 | 0.4 | 0.6 |
| 72 | 1.4 | 0.4 | 0.5 |

Table 5 shows that at 4° C. (cold storage temperature), when the laccase was added directly, the 530/350 nm ratio was decreased to 0.5 after 24 hours, whereas when the laccase was formulated in fat, the 530/350 nm ratio was decreased to 0.5 after 48-72 hours I.e., the rate of browning was significantly lower when the laccase was formulated in fat.

Example 5

Burger Patties Comprising Plant-Based Fat Formulated Laccase

A plant-based burger patty was prepared by mixing 50 g of texturized pea protein (extruded yellow pea protein isolate) pre-soaked in 90 g of water, 2.4 g potato starch, 1.4 g salt and 10 g beetroot powder. For each patty 20 g was weighed out and a patty of 4.5 cm in diameter was formed. Either no laccase, or 14.3 mg EP/kg, 7.15 mg EP/kg or 1.24 mg EP/kg MtL laccase was added per patty. The patties were fried to a core temperature of 75-80° C., allowed to cool down and cut through the middle.

Significant browning in the core of the patty was observed for the 14.3 mg EP/kg and 7.15 mg EP/kg dosages.

TABLE 6

| Laccase (mg EP/kg) | 0 | 1.24 | 7.15 | 14.3 |
|---|---|---|---|---|
| Degree of browning | − | + | ++ | +++ |

Browning was also observed during cooking when 14.3 mg EP/kg laccase was mixed with coconut fat prior to the formulation of the burger patty.

TABLE 7

| Laccase in fat (mg EP/kg) | 0 | 14.3 |
|---|---|---|
| Degree of browning | − | ++ |

Example 6

Copper Oxidase Phylogenetic Tree and Prosite Sequence Patterns

Laccase Phylogenetic Tree

A phylogenetic tree was constructed of laccase polypeptide sequences containing an AA1 domain as defined in CAZY (Lombard, Henrissat et al, 2014. The carbohydrate-active enzymes database (CAZy) in 2013. *Nucleic Acids Res.* 42, http://www.cazy.org/). The phylogenetic tree was constructed from a multiple alignment of mature polypeptide sequences containing at least one AA1 domain. The sequences were aligned using the MUSCLE algorithm version 3.8.31 (Edgar, 2004. *Nucleic Acids Research* 32(5): 1792-1797), and the trees were constructed using FastTree version 2.1.8 (Price et al., 2010, *PloS one* 5(3)) and visualized using iTOL (Letunic & Bork, 2007. *Bioinformatics* 23(1): 127-128).

A subset of polypeptides containing an AA1 domain, also contains three Cu-oxidase domains as defined by Pfam domain IDs PF00394 (Cu-oxidase), PF07731 (Cu-oxidase_2), and PF07732 (Cu-oxidase_3) (The Pfam protein families database: towards a more sustainable future: R. D. Finn, P. Coggill, R. Y. Eberhardt, S. R. Eddy, J. Mistry, A. L. Mitchell, S. C. Potter, M. Punta, M. Qureshi, A. Sangrador-Vegas, G. A. Salazar, J. Tate, A. Bateman, *Nucleic Acids Research* (2016) Database Issue 44:D279-D285; Pfam database version 32). All laccase polypeptides of Table 1 (Example 1) and Table 9 (Example 7) contain an AA1 domain, as well as the three Pfam domains. As an example, in SEQ ID NO: 5 from *Myceliophthora thermophila*, which is the same as SEQ ID NO: 1 except that the signal peptide is included, the AA1 domain is located at positions 82 to 597, and the Pfam domains at positions 96 to 206 (PF07732), 216 to 362 (PF00394), and 439 to 569 (PF07731).

Prosite Sequence Patterns

A subset of polypeptides containing an AA1 domain may contain one or more prosite sequence patterns (De Castro et al, ScanProsite: detection of PROSITE signature matches and ProRuleassociated functional and structural residues in proteins. *Nucleic Acids Res.* 2006 Jul. 1; 34). An example is the conserved prosite pattern disclosed in WO2016/097270, W-Y-H-X-H-X(3)-Q-YX-D-G-X(2)-G, wherein X is an amino acid residue A, R, N, D, C, Q, E, G, H, I, L, K, M, F, P, S, T, W, Y or V. This prosite sequence pattern is located in positions 183 to 198 of SEQ ID NO: 5 of the present application (MtL).

All laccase polypeptides of Table 1 (Example 1) contain conserved prosite pattern W-Y-H-X-HX(3)-Q-Y-X-D-G-X(2)-G. The *A. niger* laccase polypeptides of Table 9 (Example 7) does not contain such prosite pattern.

It is found that a laccase having a prosite pattern according to prosite sequence pattern W-Y-HX-H-X(3)-Q-Y-X-D-G-X(2)-G efficiently converts the red colour of e.g. beetroot juice into brown. Whereas the two laccases from *A. niger*, which are shown in Example 7 to not work, does not comprise such prosite pattern. Accordingly, a laccase having such prosite pattern efficiently converts the red colour of e.g. beetroot juice.

Examples of laccases having a prosite sequence W-Y-H-X-H-X(3)-Q-Y-X-D-G-X(2)-G are shown in Table 8.

TABLE 8

| UniProt accesion | Species | Matched prosite sequence in protein |
|---|---|---|
| SEQ ID NO: 5 (P4454R/Mt1) | *Myceliophthora thermophila/ Thermothelomyces thermophilus* | 183-WYHSHFSAQYGNGVVG-198 |
| SEQ ID NO: 6 (Q02081) | *Rhizoctonia solani/ Thanatephorus cucumeris* | 126-WYHAHLASQYVDGLRG-141 |
| SEQ ID NO: 8 (P33ZPR) | *Polyporus pinsitus/ Trametes villosa* | 128-WYHSHLSTQYCDGLRG-143 |
| SEQ ID NO: 7 (P26/Cc1) | *Coprinus cinereus/ Coprinopsis cinerea* | 125-WYHSHFGTQYCDGLRG-140 |
| A0A060SB08 | *Pycnoporus cinnabarinus* | 126-WYHSHLSTQYCDGLRG-143 |
| A0A067TCQ3 | *Galerina marginata* (strain CBS 339.88) | 133-WYHSHHSTQYCDGLRG-143 |
| A0A0AORIX4 | *Flammulina velutipes* (*Agaricus velutipes*) | 127-WYHSHLSTQYCDGIRG-142 |
| A0A144KZD6 | *Trametes versicolor* | 127-WYHSHLSTQYCDGLRG-142 |
| A8N893 | *Coprinopsis cinerea* (strain Okayama-7) | 116-WYHSHHQTQYCDGLRG-131 |
| B0DUR0 | *Laccaria bicolor* | 146-WYHSHHSTQYCDGLRG-161 |
| D2KYZ9 | *Pleurotus salmoneostramineus* | 126-WYHSHVRTQYCDGLRG-141 |

SEQ ID NO: 5 from *Myceliophthora thermophila* is the same as SEQ ID NO: 1 except that the signal peptide is included.

SEQ ID NO: 6 from *Rhizoctonia solani* is the same as SEQ ID NO: 2 except that the signal peptide is included.

SEQ ID NO: 7 from *Coprinus cinereus* is the same as SEQ ID NO: 3 except that the signal peptide is included.

SEQ ID NO: 8 from *Polyporus pinsitus* is the same as SEQ ID NO: 4 except that the signal peptide is included.

Further laccases having a prosite sequence W-Y-H-X-H-X(3)-Q-Y-X-D-G-X(2)-G are shown in WO2016/097270, e.g., in Table 1 and at page 5. Of these, the laccases from *T. hirsuta, P. brumalis, P. radiata* and *C. subvernispora* are shown in the examples of WO2016/097270 to be able to convert the colour of Annatto in whey.

WO2016/097270 discloses that a laccase having the prosite pattern W-Y-H-X-H-X(3)-Q-Y-X-DG-X(2)-G has a more active site structure compared with laccases lacking this prosite pattern. Examples of laccases with a prosite pattern and this open structure can be found in PDB identifiers: 1 KYA, 3V9C, 3FPX, and 2XYB.

We have further found that the laccases which efficiently convert the red colour of e.g. beetroot juice are also characterized by comprising the conserved prosite pattern according to amino acid sequence G-T-X-W-Y-H-X(5)-Q-Y. Whereas the two non-working *A. niger* laccases do not comprise this prosite pattern either. As an example, this prosite sequence pattern is located in positions 180 to 192 of SEQ ID NO: 5 of the present application (MtL).

We have further found that the laccases which efficiently convert the red colour of e.g. beetroot juice are also characterized by comprising the conserved prosite pattern according to amino acid sequence [IL]-X-D-[YW]-[YFNM]-[YHG]. Whereas the two non-working *A. niger* laccases do not comprise this prosite pattern either. [IL] means that the amino acid can be either I or L, [YW] means that the amino acid can be either Y or W, etc. X can be any of the 20 amino acids.

Example 7

Two Laccases from *A. niger* Lacking the Prosite Patterns Identified in Example 6 Cannot Convert the Red Colour of Beetroot Juice into Brown Beet root juice (1%) was prepared by solubilising beet root powder (1%) in a 50 mM MES buffer (pH 6.3). 10 mg/l of the enzymes shown in Table 9 was added to the beet root juice and incubated for 10 minutes at 50° C. The absorbance at 350 and 530 nm was measured in a spectrophotometer and the decrease in the 530/350 nm ratio was used as a measure of browning.

TABLE 9

| Enzymes tested (10 mg/l) | Abs 530/350 nm |
|---|---|
| Blank | 1.4 |
| MtL laccase | 0.6 |
| Purified *A. niger* laccase expressed in *Aspergillus oryzae* OXI (SEQ ID NO: 9) | 1.3 |
| Purified *A. niger* laccase expressed in *Aspergillus oryzae* OXL (SEQ ID NO: 10) | 1.3 |

The two laccases from *A. niger* which were also tested in WO2016/097270 have been heterologously expressed in *Aspergillus oryzae*.

For producing purified laccases, single sequence verified expression clones have been isolated It is concluded that the *A. niger* laccases which do not comprise the prosite patterns identified in Example 6 do not show a browning effect in the assay described above.

The invention claimed is:

1. A meat analogue product comprising at least 50% w/w plant protein out of total protein, a red pigment which changes colour when oxidized, and an enzyme having laccase activity, wherein the amino acid sequence of the enzyme having laccase activity comprises a sequence consisting of W-Y-H-X-H-X(3)-Q-Y-X-D-G-X(2)-G, where X can be any of A, R, N, D, C, Q, E, G, H, I, L, K, M, F, P, S, T, W, Y or V, and wherein the enzyme having laccase activity is embedded in a fat having a melting temperature of at least 25° C.

2. A method for producing the meat analogue product of claim 1, comprising:
   a) providing a material comprising at least 50% w/w plant protein out of total protein; and
   b) adding to such material a red pigment which changes colour when oxidized and also adding an enzyme having laccase activity, wherein the amino acid sequence of the enzyme having laccase activity comprises a sequence consisting of W-Y-H-X-H-X(3)-Q-Y-X-D-G-X(2)-G, where X can be any of A, R, N, D, C, Q, E, G, H, I, L, K, M, F, P, S, T, W, Y or V, and wherein the enzyme having laccase activity is embedded in a fat having a melting temperature of at least 25°.

3. The meat analogue product of claim 1, wherein the consisting of W-Y-H-X-H-X(3)-Q-Y-X-D-G-X(2)-G, where X can be any of A, R, N, D, C, Q, E, G, H, I, L, K, M, F, P, S, T, W, Y or Vis a prosite sequence.

4. The meat analogue product of claim 1, wherein the fat is a plant-based fat.

5. The meat analogue product of claim 1, wherein the red pigment is obtained from a plant.

6. The meat analogue product of claim 1, wherein the red pigment is betanin or amaranth pigment.

7. The meat analogue product of claim 1, wherein the red pigment is betanin in the form of beetroot juice or beetroot powder.

8. The meat analogue product of claim 1, wherein the meat analogue product is selected among a minced-meat analogue product, a burger patty, a sausage, a meat-ball analogue product, and a gullasch meat analogue product.

9. The meat analogue product of claim 1, wherein at least 50% w/w of the plant protein is obtained from cereals, e.g. rice, corn, wheat, oat; pseudocereals, e.g. buckwheat, quinoa; tubers, e.g. potato; oilseeds, e.g. soybean, sunflower; legumes, e.g. pea, chickpea, lentils, lupin; or leaves, e.g. grass.

10. The meat analogue product of claim 1, wherein the plant protein has been extruded, preferably extruded and minced.

11. The meat analogue product of claim 1, wherein the enzyme having laccase activity is isolated.

12. The meat analogue product of claim 1, wherein the enzyme having laccase activity is a laccase.

13. The meat analogue product of claim 1, wherein the concentration of the enzyme having laccase activity is 0.1-100 mg EP/kg meat analogue product.

14. The meat analogue product of claim 9, wherein at least 50% w/w of the plant protein is obtained from pea.

15. The meat analogue product of claim 1, wherein the enzyme having laccase activity is a laccase classified as E.C. 1.10.3.2.

16. The meat analogue product of claim 1, wherein the amino acid sequence of the enzyme having laccase activity comprises a sequence consisting of G-T-X-W-Y-H-X(5)-Q-Y, where X can be any of A, R, N, D, C, Q, E, G, H, I, L, K, M, F, P, S, T, W, Y or V.

17. The meat analogue product of claim 1, wherein the amino acid sequence of the enzyme having laccase activity comprises a sequence consisting of [IL]-X-D-[YW]-[YFNM]-[YHG], where [IL] means that the amino acid can be either I or L, [YW] means that the amino acid can be either Y or W, [YFNM] means that the amino acid can be either Y, F, N or M, [YHG] means that the amino acid can be either Y, H or G, and X can be any of A, R, N, D, C, Q, E, G, H, I, L, K, M, F, P, S, T, W, Y or V.

* * * * *